US012608898B2

(12) United States Patent
Ma

(10) Patent No.: US 12,608,898 B2
(45) Date of Patent: Apr. 21, 2026

(54) METHODS, APPARATUSES, DEVICE AND STORAGE MEDIUM FOR DISPLAYING CONTENT IN VIRTUAL SCENE

(71) Applicant: Beijing Zitiao Network Technology Co., Ltd., Beijing (CN)

(72) Inventor: Xindu Ma, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 172 days.

(21) Appl. No.: 18/534,212

(22) Filed: Dec. 8, 2023

(65) Prior Publication Data

US 2024/0212301 A1 Jun. 27, 2024

(30) Foreign Application Priority Data

Dec. 23, 2022 (CN) .......................... 202211663632.7
Dec. 23, 2022 (CN) .......................... 202211663634.6

(51) Int. Cl.
*G06T 19/00* (2011.01)
*G06T 7/70* (2017.01)
*G06T 19/20* (2011.01)

(52) U.S. Cl.
CPC ................ *G06T 19/20* (2013.01); *G06T 7/70* (2017.01); *G06T 2219/2024* (2013.01)

(58) Field of Classification Search
None
See application file for complete search history.

(56) References Cited

U.S. PATENT DOCUMENTS 10,078,917 B1 * 9/2018 Gaeta .................. G06F 3/04815
2014/0300547 A1 * 10/2014 Hosenpud ............... G06F 3/011
345/158
2020/0409455 A1 * 12/2020 Wilson .................... G06T 19/20

FOREIGN PATENT DOCUMENTS

CN 101299220 A 11/2008
CN 104063484 A 9/2014
CN 104267871 A 1/2015
CN 104423841 A 3/2015
CN 106126032 A 11/2016
CN 106910250 A 6/2017

* cited by examiner

*Primary Examiner* — Martin Mushambo
(74) *Attorney, Agent, or Firm* — Astute IP Law Group

(57) ABSTRACT

According to the embodiments of this disclosure, methods, apparatuses, device, and storage medium for displaying content in a virtual scene are provided. A method includes: detecting a first reference to a second content in a first content contained in a first window presented in a virtual scene; in response to detecting the first reference, in the virtual scene: presenting the first window simultaneously with presenting a second window for displaying a preview of the second content; and presenting an indication representing an association relationship between the first reference and the second window.

27 Claims, 27 Drawing Sheets

700

710
DETECT A FIRST REFERENCE TO A SECOND CONTENT IN A FIRST CONTENT CONTAINED IN A FIRST WINDOW PRESENTED IN A VIRTUAL SCENE

720
IN RESPONSE TO DETECTING THE FIRST REFERENCE, IN THE VIRTUAL SCENE:
PRESENT THE FIRST WINDOW SIMULTANEOUSLY WITH PRESENTING A SECOND WINDOW FOR DISPLAYING A PREVIEW OF THE SECOND CONTENT; AND
PRESENT AN INDICATION REPRESENTING AN ASSOCIATION RELATIONSHIP BETWEEN THE FIRST REFERENCE AND THE SECOND WINDOW

100

120-1

COMPUTING
DEVICE 120-2

COMPUTING
DEVICE 110-2

130

110-1

140-1

140-2

200

210

220

260

240

250 230

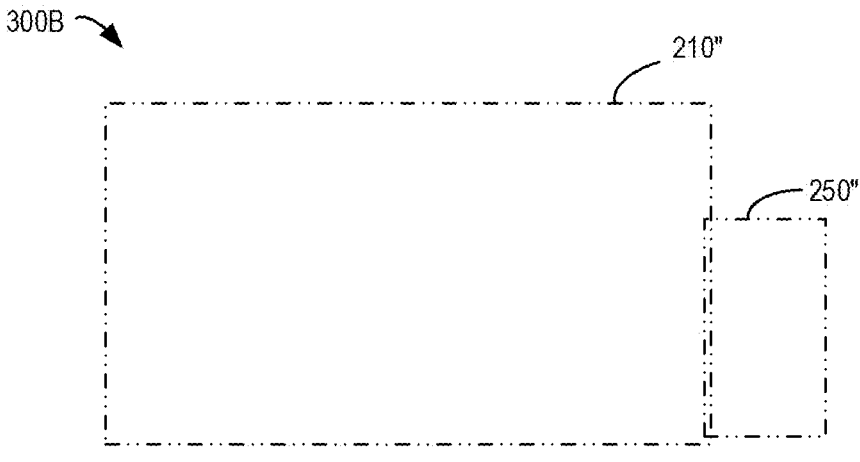
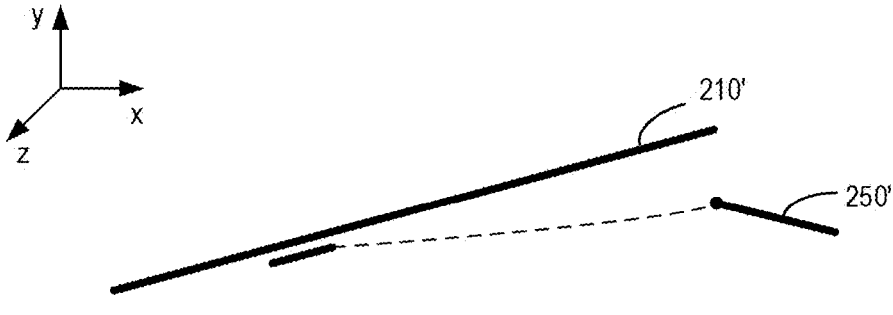
FIG. 3B

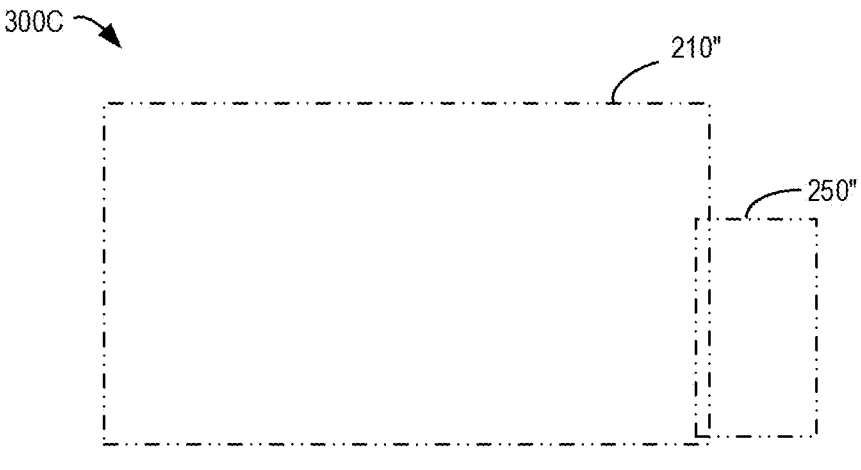
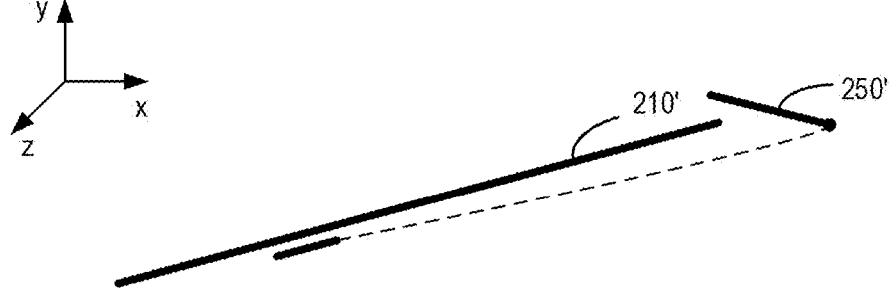
FIG. 3C

600

700

800

900

1000A

1000B

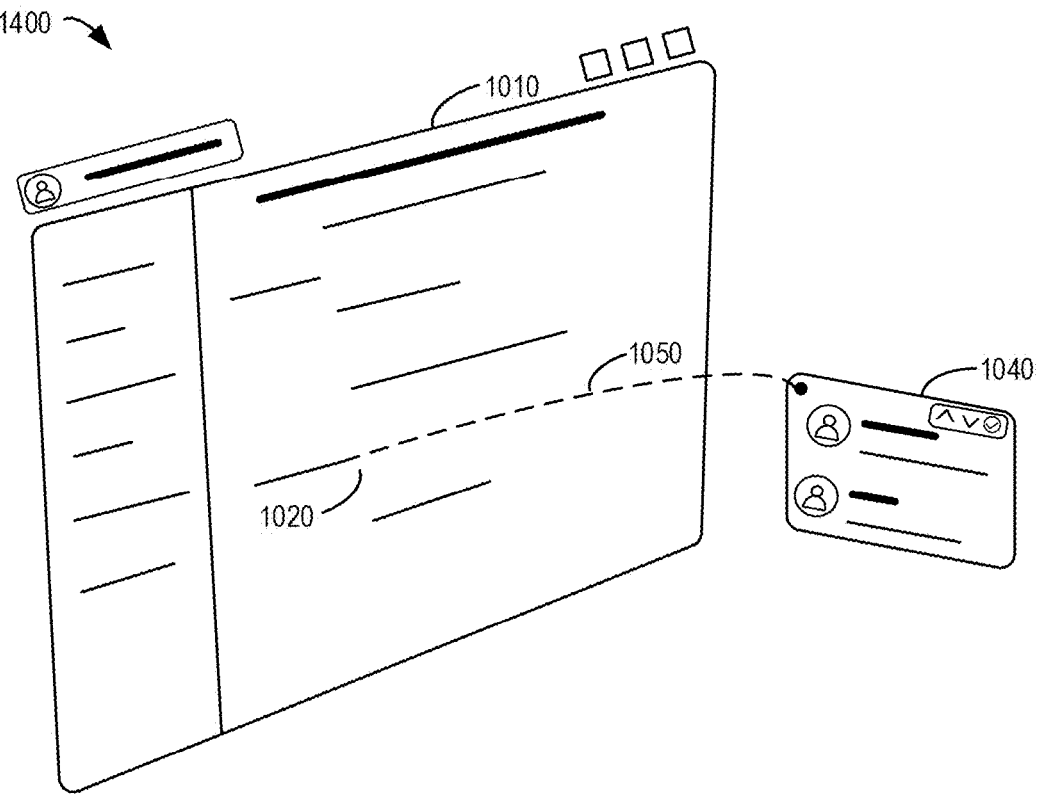
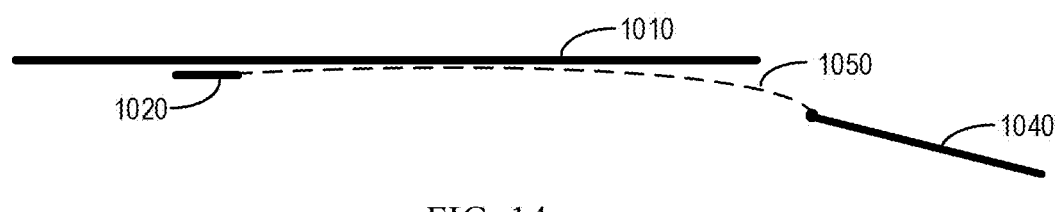
FIG. 14

1500

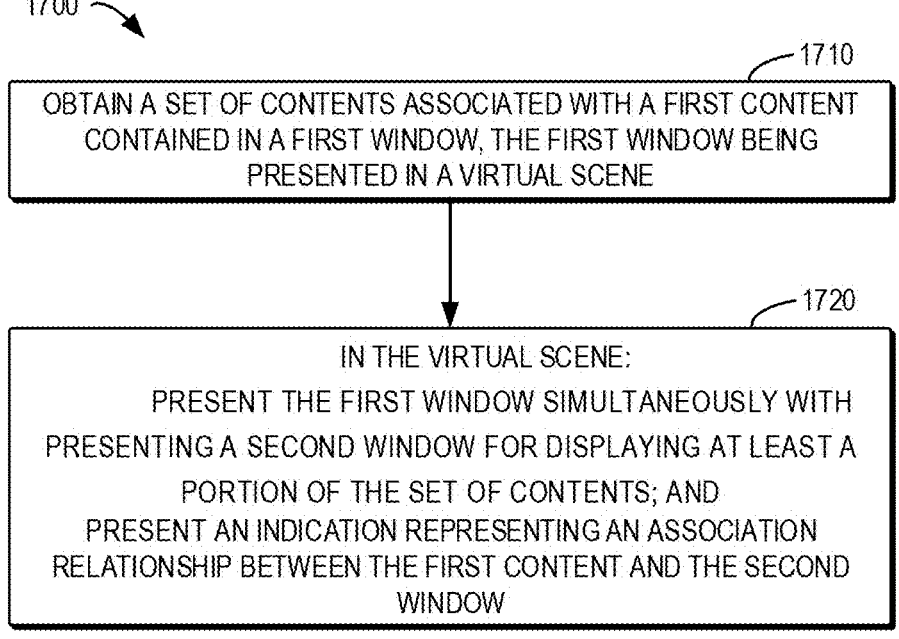

1700

1710

OBTAIN A SET OF CONTENTS ASSOCIATED WITH A FIRST CONTENT CONTAINED IN A FIRST WINDOW, THE FIRST WINDOW BEING PRESENTED IN A VIRTUAL SCENE

1720

IN THE VIRTUAL SCENE:
PRESENT THE FIRST WINDOW SIMULTANEOUSLY WITH PRESENTING A SECOND WINDOW FOR DISPLAYING AT LEAST A PORTION OF THE SET OF CONTENTS; AND
PRESENT AN INDICATION REPRESENTING AN ASSOCIATION RELATIONSHIP BETWEEN THE FIRST CONTENT AND THE SECOND WINDOW

FIG. 17

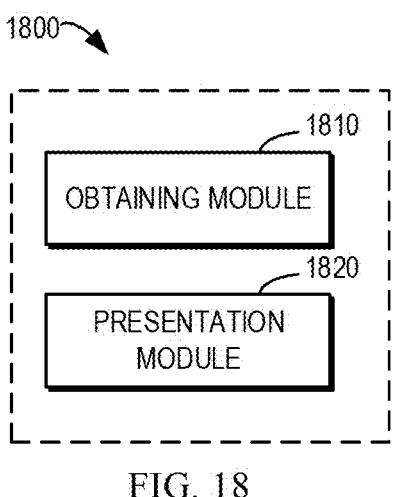

1800

1810

OBTAINING MODULE

1820

PRESENTATION MODULE

METHODS, APPARATUSES, DEVICE AND STORAGE MEDIUM FOR DISPLAYING CONTENT IN VIRTUAL SCENE

CROSS REFERENCE

The present application claims priorities to Chinese Patent Application No. 202211663634.6, filed on Dec. 23, 2022, and entitled "method, apparatus, device and storage medium for displaying content in virtual scene", and Chinese Patent Application No. 202211663632.7, filed on Dec. 23, 2022, and entitled "method, apparatus, device and storage medium for displaying content in virtual scene", the entireties of which are incorporated herein by reference.

FIELD

The example embodiments of the present disclosure generally relate to the field of computers, and more particularly to methods, apparatuses, device, and computer readable storage medium for displaying content in a virtual scene.

BACKGROUND

Office work in the cloud era involves the display, browsing, and sharing of a large number of contents. There may be reference relationships between different contents, for example, documents or web pages containing referenced contents. However, in a virtual scene of Extended Reality (XR) products, people cannot accurately perceive such reference relationships, which reduces the efficiency of users in obtaining information and greatly affects the interaction experience between users.

SUMMARY

In a first aspect of the present disclosure, a method of displaying content in a virtual scene is provided. The method comprises: detecting a first reference to a second content in a first content contained in a first window presented in a virtual scene; in response to detecting the first reference, in the virtual scene: presenting the first window simultaneously with presenting a second window for displaying a preview of the second content; and presenting an indication representing an association relationship between the first reference and the second window.

In a second aspect of the present disclosure, an apparatus for displaying content in a virtual scene is provided. The apparatus comprises: a detection module configured to detect a first reference to a second content in a first content contained in a first window presented in a virtual scene; a first presentation module configured to in response to detecting the first reference, in the virtual scene: present the first window simultaneously with presenting a second window for displaying a preview of the second content; and present an indication representing an association relationship between the first reference and the second window.

In a third aspect of the present disclosure, an electronic device is provided. The device comprises: at least one processing unit; and at least one memory coupled to the at least one processing unit and storing instructions for execution by the at least one processing unit, the instructions, when executed by the at least one processing unit, causing the electronic device to perform a method of the first aspect.

In a fourth aspect of the present disclosure, a computer readable storage medium is provided. The computer readable storage medium stores thereon a computer program executable by a processor to implement a method of the first aspect.

In a fifth aspect of the present disclosure, a method of displaying content in a virtual scene is provided. The method comprises: obtaining a set of contents associated with a first content contained in a first window, the first window being presented in a virtual scene; and in the virtual scene: presenting the first window simultaneously with presenting a second window for displaying at least a portion of the set of contents; and presenting an indication representing an association relationship between the first content and the second window.

In a sixth aspect of the present disclosure, an apparatus for displaying content in a virtual scene is provided. The apparatus comprises: an obtaining module configured to obtain a set of contents associated with a first content contained in a first window, the first window being presented in a virtual scene; and a presentation module configured to in the virtual scene: presenting the first window simultaneously with presenting a second window for displaying at least a portion of the set of contents; and presenting an indication representing an association relationship between the first content and the second window.

In a seventh aspect of the present disclosure, an electronic device is provided. The device comprises: at least one processing unit; and at least one memory coupled to the at least one processing unit and storing instructions for execution by the at least one processing unit, the instructions, when executed by the at least one processing unit, causing the electronic device to perform a method of the fifth aspect.

In an eighth aspect of the present disclosure, a computer-readable storage medium is provided. The computer readable storage medium stores thereon a computer program executable by a processor to implement a method of the fifth aspect.

It would be appreciated that the content described in the Summary section of the present invention is neither intended to identify key or essential features of the implementations of the present disclosure, nor is it intended to limit the scope of the present disclosure. Other features of the present disclosure will be readily envisaged through the following description.

BRIEF DESCRIPTION OF THE DRAWINGS

In conjunction with the accompanying drawings and with reference to the following detailed description, the above and other features, advantages and aspects of the embodiments of the present disclosure will become more apparent. In the drawings, the same or similar reference numerals representing the same or similar elements, wherein:

FIGS. 3A to 3D illustrate schematic diagrams of multiple examples of layout of a first window and a second window according to some embodiments of the present disclosure;

3

Figure 6:
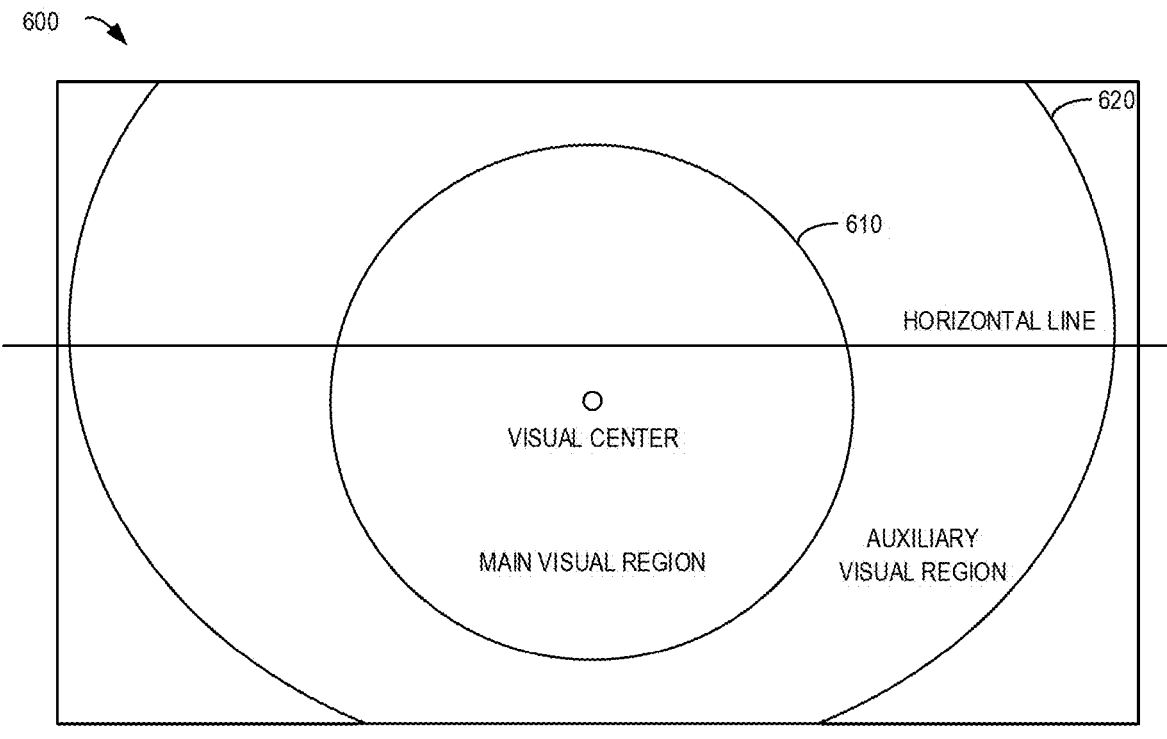
Figure 7:
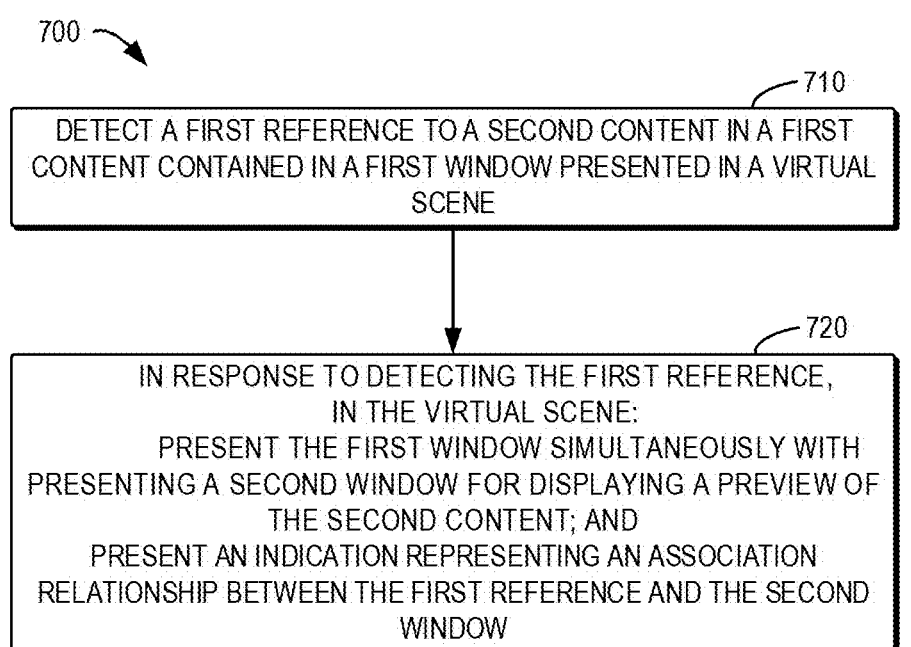
Figure 8:
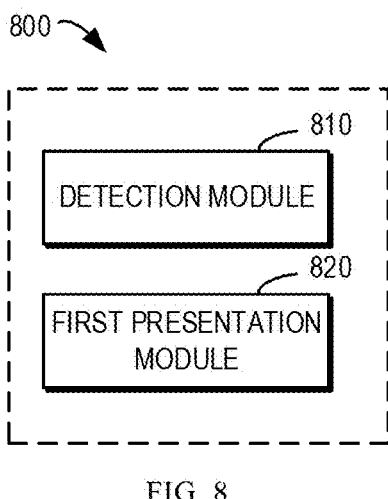
Figure 9:
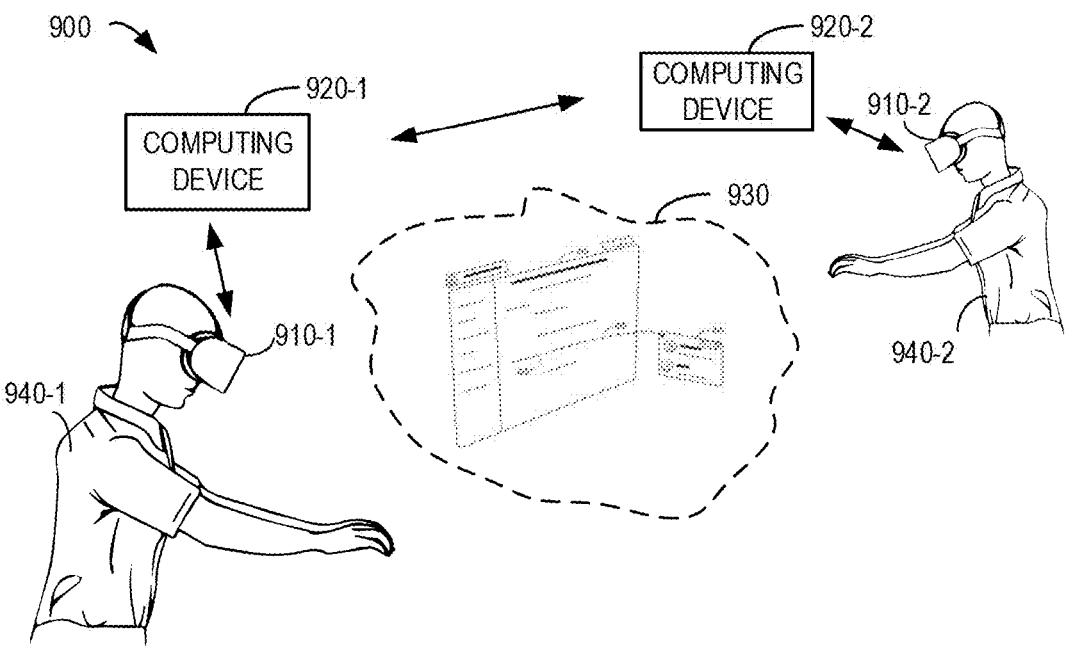
Figure 11A:
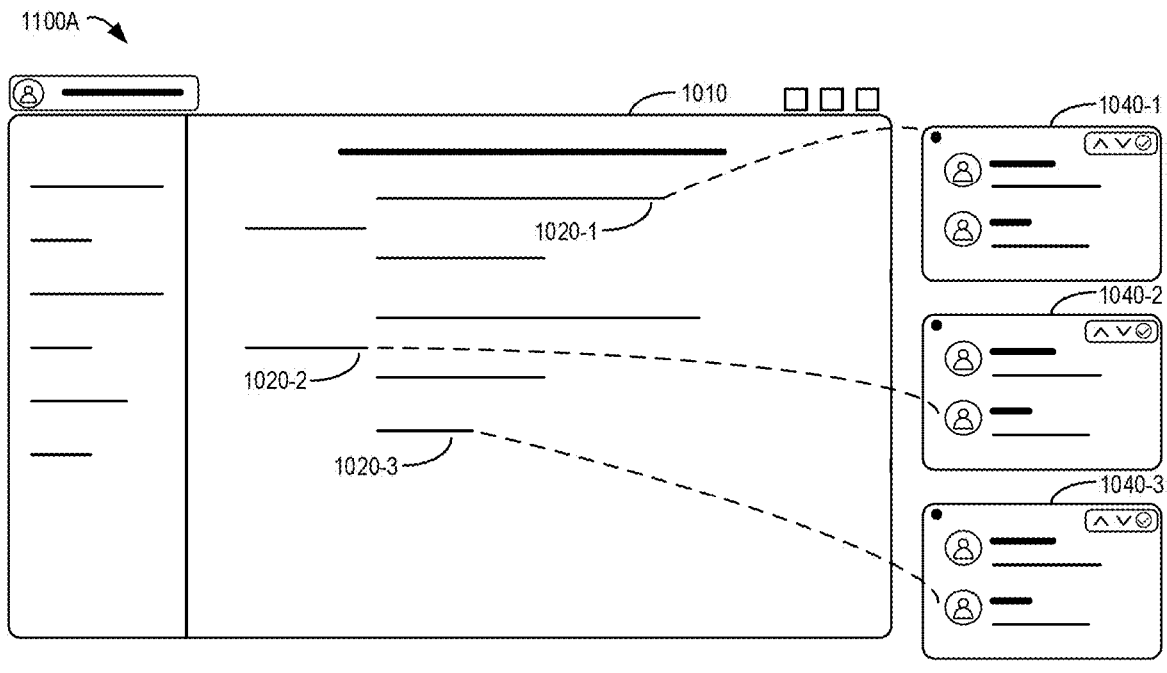
Figure 11B:
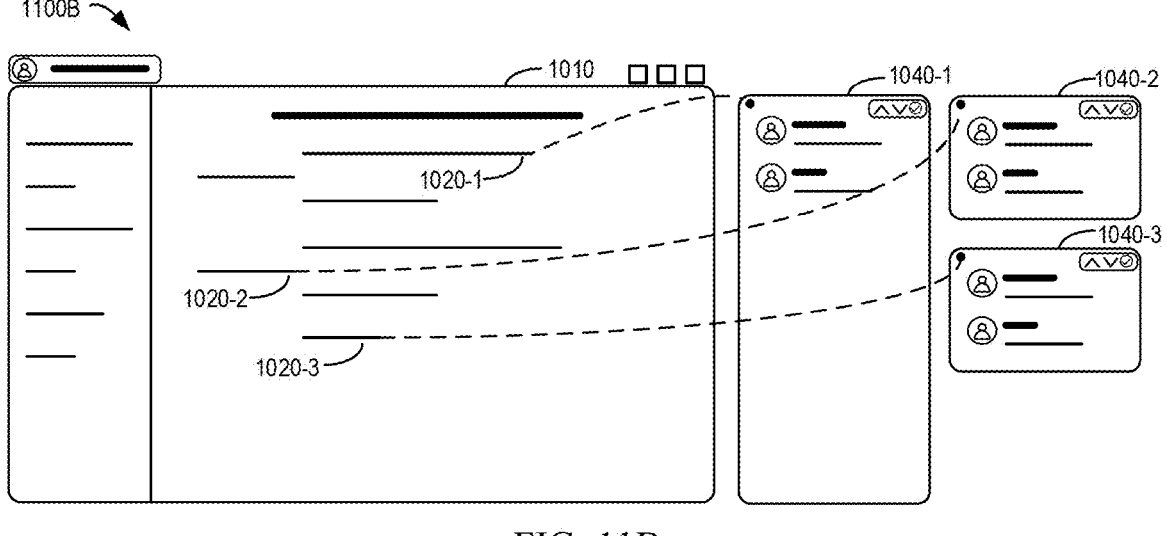
Figure 13A:
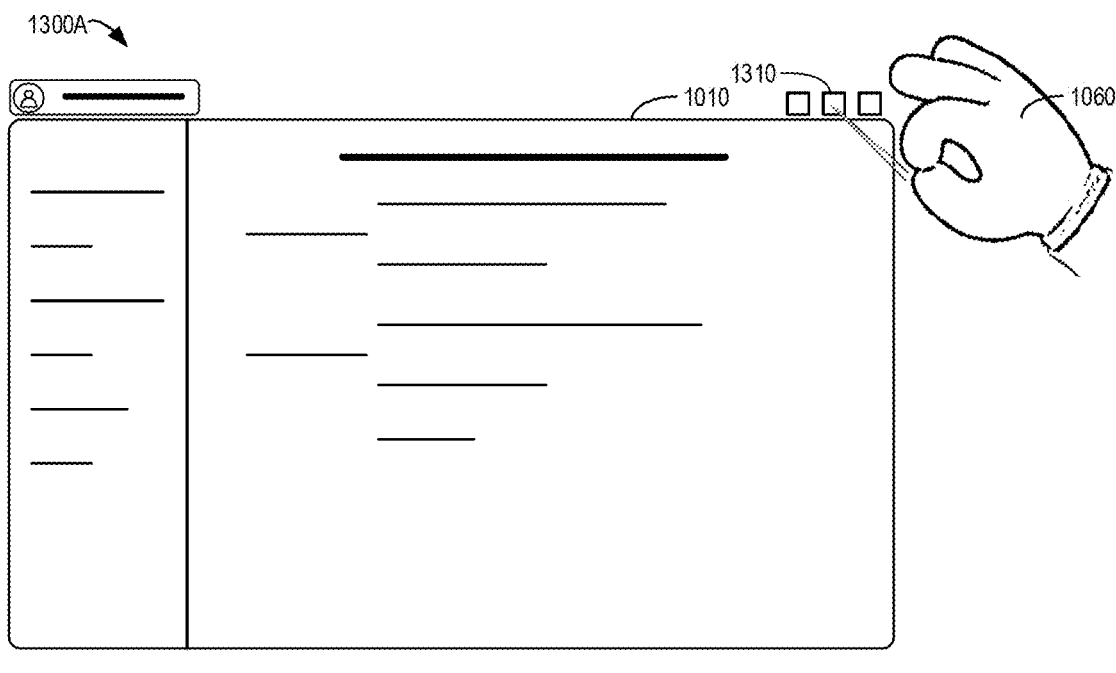
Figure 13B:
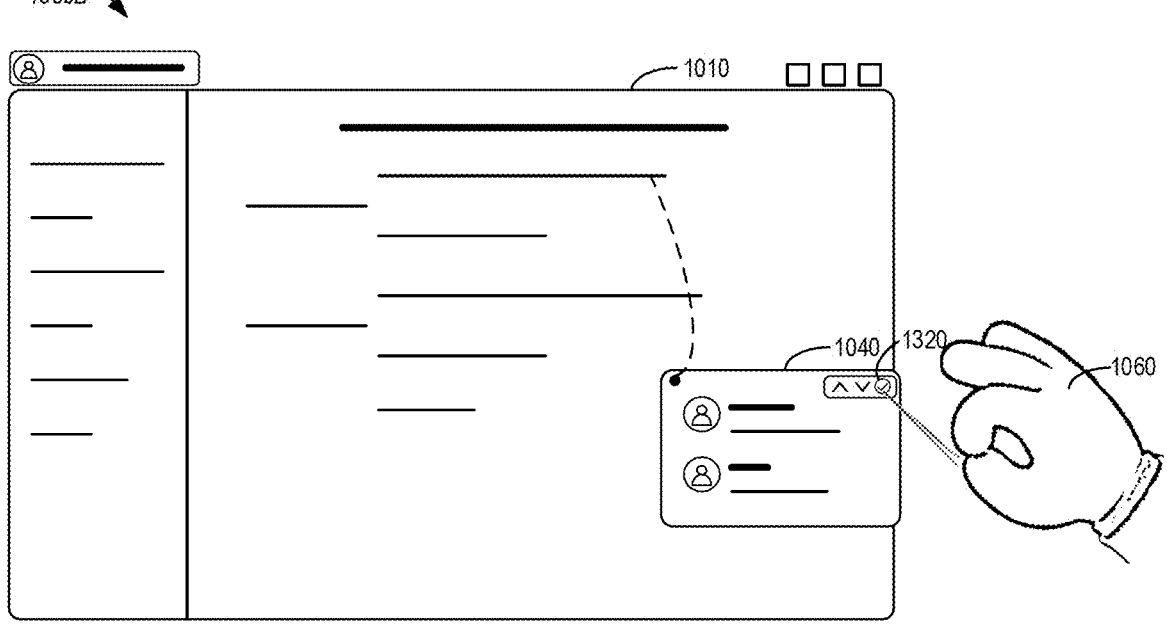
Figure 15:
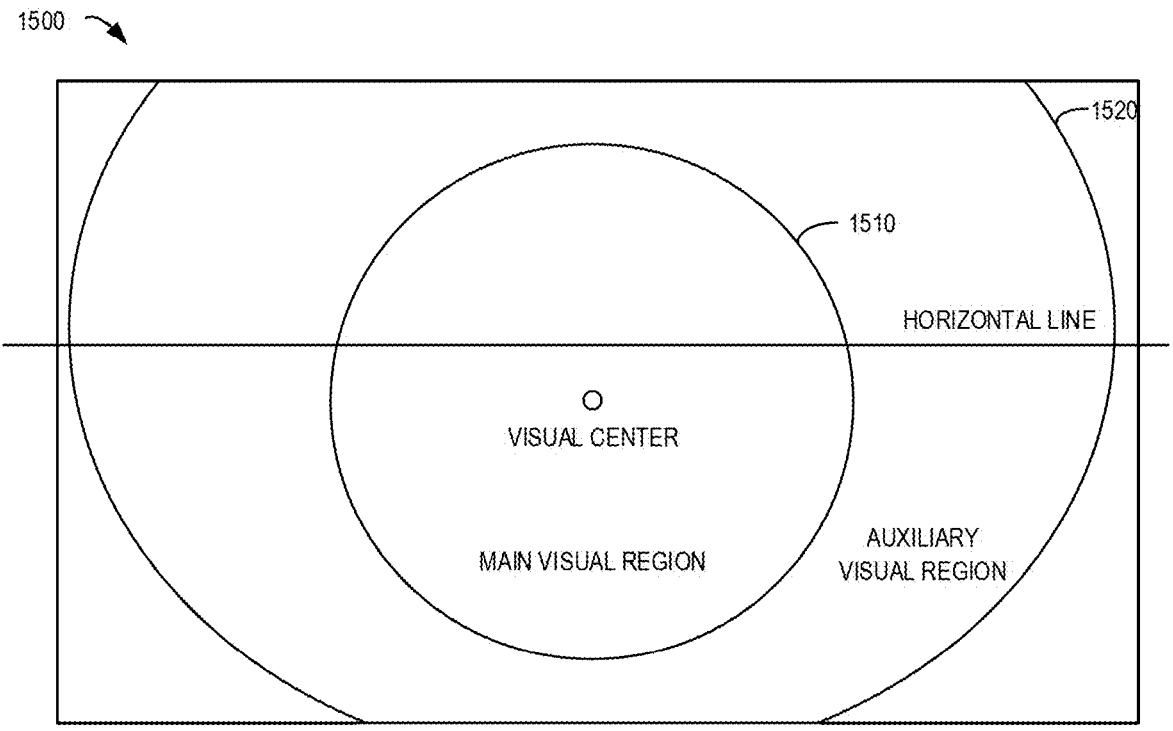
Figure 16A:
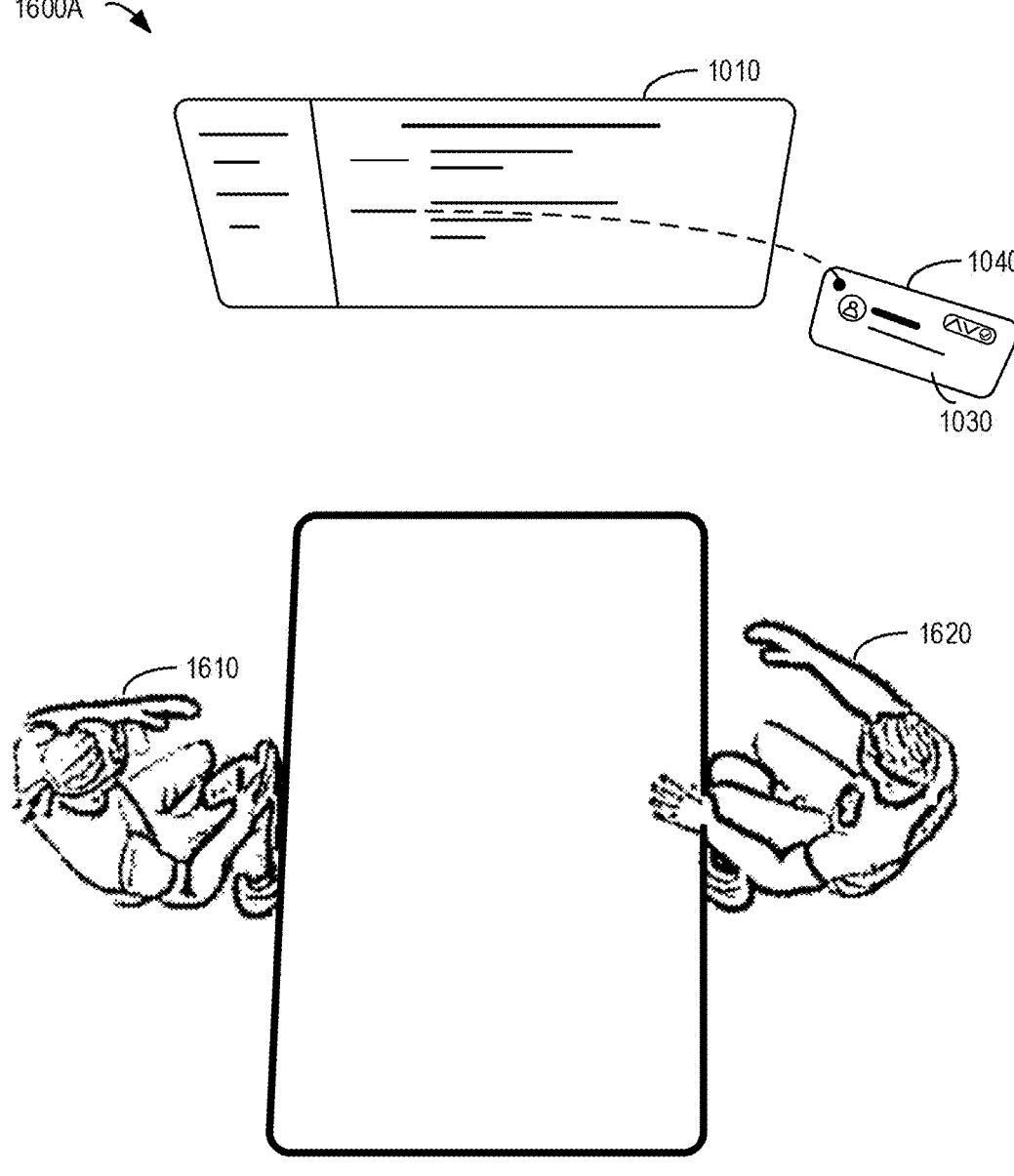
Figure 16B:
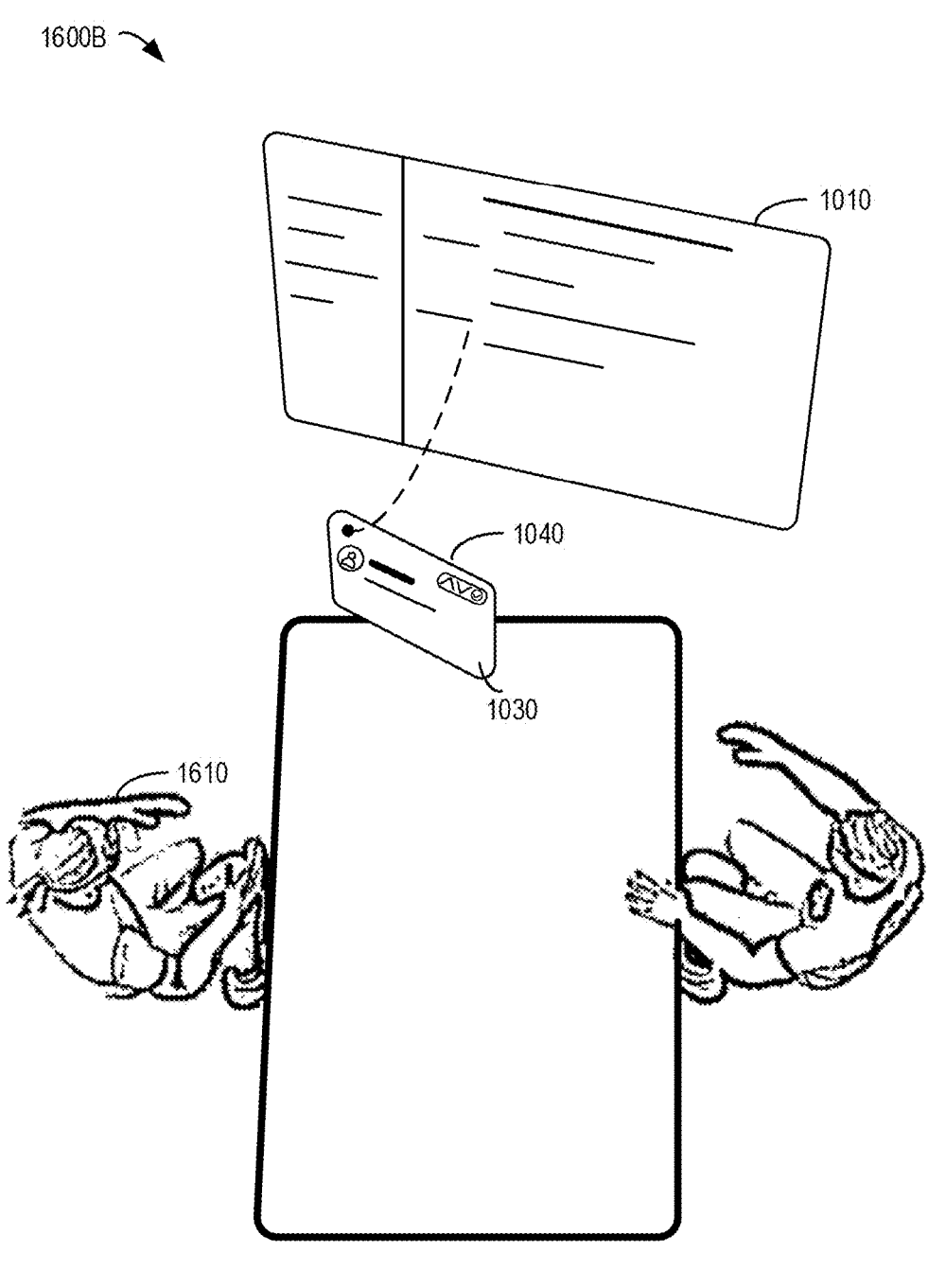
Figure 16C:
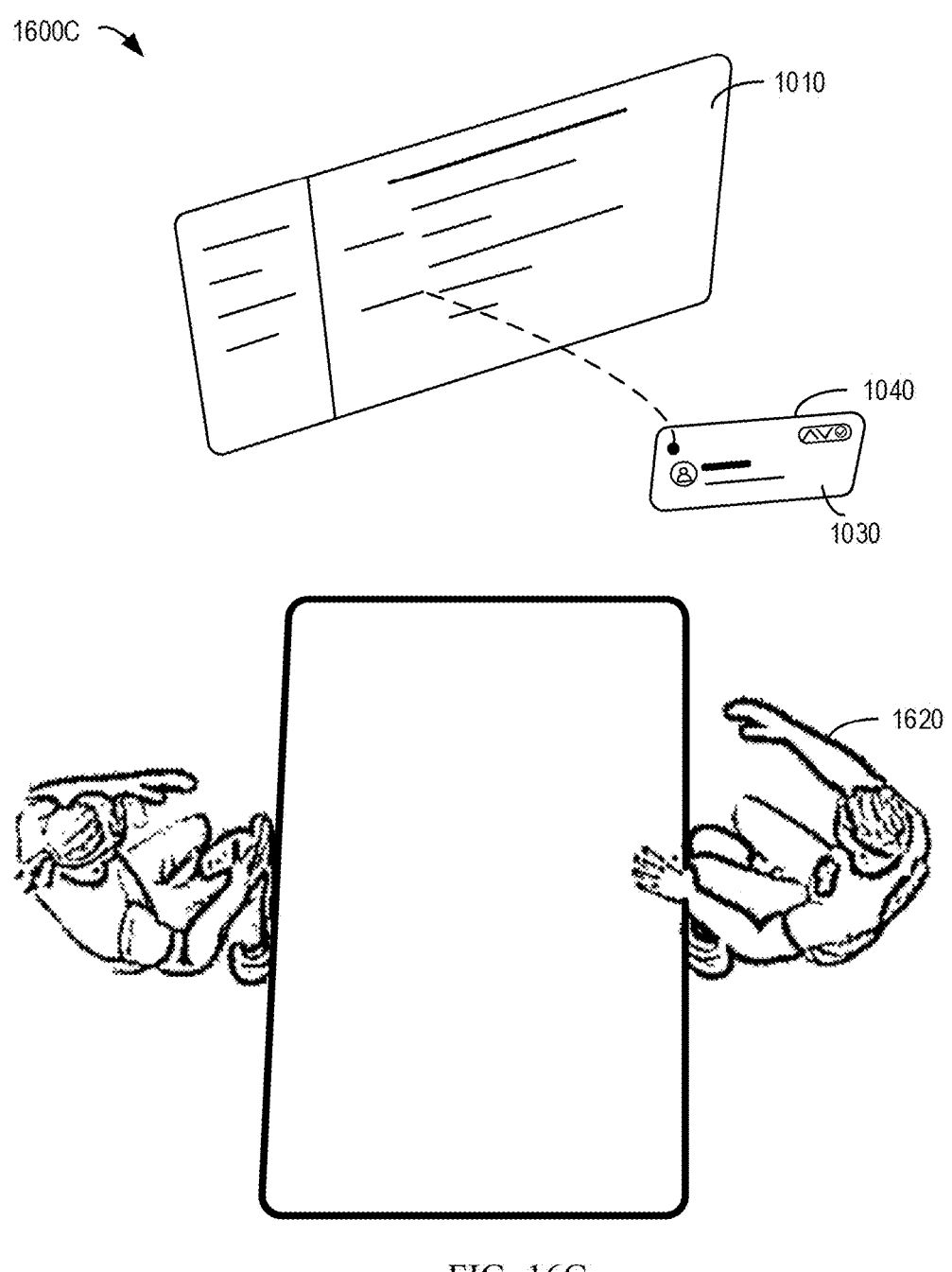
Figure 19:
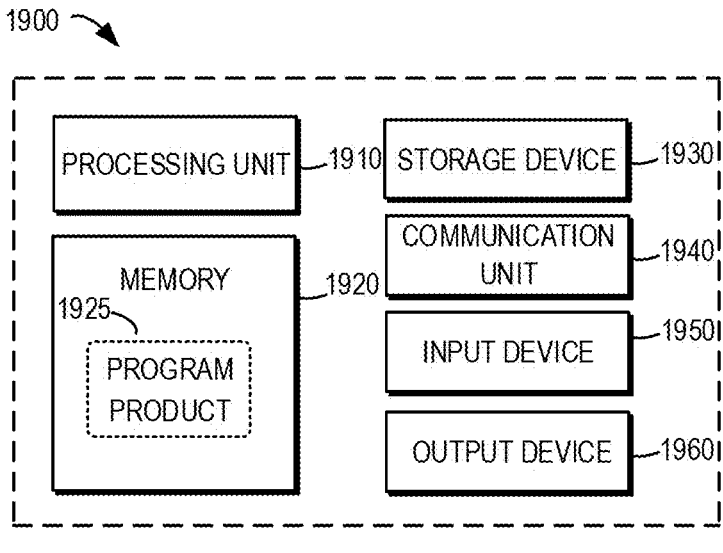

FIGS. 5A to 5D illustrate schematic diagrams of multiple examples of presenting styles of a plurality of windows according to some embodiments of the present disclosure;

FIG. 6 illustrates a schematic diagram of an example of a predetermined field of view range according to some embodiments of the present disclosure;

FIG. 7 illustrates a flowchart of a process of displaying content in a virtual scene according to some embodiments of the present disclosure;

FIG. 8 illustrates a block diagram of an apparatus for displaying content in a virtual scene according to some embodiments of the present disclosure;

FIG. 9 illustrates a schematic diagram of example environments in which embodiments of the present disclosure may be implemented;

FIGS. 10A to 10D illustrate schematic diagrams of multiple examples of displaying a set of comments in a virtual scene according to some embodiments of the present disclosure;

FIGS. 11A and 11B illustrate schematic diagrams of multiple examples of displaying multiple sets of comments in a virtual scene according to some embodiments of the present disclosure;

FIGS. 12A to 12D illustrate schematic diagrams of multiple examples of displaying multiple sets of comments in a virtual scene according to some embodiments of the present disclosure;

FIGS. 13A and 13B illustrate schematic diagrams of multiple examples of showing or hiding comments according to some embodiments of the present disclosure;

FIG. 14 illustrates a schematic diagram of an example of presenting a first window and a second window according to some embodiments of the present disclosure;

FIG. 15 illustrates a schematic diagram of an example of a predetermined field of view range according to some embodiments of the present disclosure;

FIGS. 16A to 16C illustrate schematic diagrams of multiple examples of displaying a set of comments relative to a virtual avatar according to some embodiments of the present disclosure;

FIG. 17 illustrates a flowchart of a process of displaying content in a virtual scene according to some embodiments of the present disclosure;

FIG. 18 illustrates a block diagram of an apparatus for displaying content in a virtual scene according to some embodiments of the present disclosure; and FIG. 19 illustrates a block diagram of a device capable of implementing a plurality of embodiments of the present disclosure.

DETAILED DESCRIPTION

It is to be understood that, before applying the technical solutions disclosed in various implementations of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

It is to be understood that data involved in the present technical solution (including but not limited to the data itself, the acquisition or use of the data) should comply with requirements of corresponding laws and regulations and relevant rules.

The embodiments of the present disclosure will be described in more detail below with reference to the accompanying drawings. Although some implementations of the present disclosure are shown in the drawings, it would be appreciated that the present disclosure can be implemented in various forms and should not be interpreted as limited to the implementations described herein. On the contrary, these implementations are provided for a more thorough and complete understanding of the present disclosure. It would be appreciated that the drawings and implementations of the present disclosure are only for illustrative purposes and are not intended to limit the scope of protection of the present disclosure.

It should be noted that the titles of any section/sub-section provided in this article are not restrictive. Various embodiments are described throughout this article, and any type of embodiment can be included under any section/sub-section. In addition, the embodiments described in any section/sub-section can be combined in any way with any other embodiments described in the same section/sub-section and/or different sections/sub-sections.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions. The terms "first", "second", etc. may refer to different or identical objects. The following may also include other explicit and implicit definitions.

As used herein, a term "model" may learn a association between corresponding inputs and outputs from training data, so that after training is completed, corresponding outputs may be generated for a given input. The generation of the model can be based on machine learning technology. Deep learning is a kind of machine learning algorithm that uses multiple layers of processing units to process inputs and provide corresponding outputs. Herein, the "model" may also be referred to as "Machine Learning model", "Machine Learning network", or "network", and these terms may be used interchangeably herein. A model may also include different types of processing units or networks.

As used herein, a "unit", "operating unit" or "subunit" may consist of any suitable structured Machine Learning model or network. As used herein, a set of elements or similar representations may include one or more such elements. For example, "a set of convolution units" may include one or more convolution units.

As mentioned briefly earlier, in the virtual scenes of XR products, people cannot accurately perceive the reference relationships between contents. Taking documents as an example, a display method of document contents and a jumping method of links in the documents greatly affect the efficiency of user obtaining information and the interaction experience between users. XR technology includes virtual reality technology (VR), augmented reality technology (AR), and mixed reality technology (MR). XR technology uses hardware devices combined with various software technology means to present virtual scenes or merge virtual contents with real scenes, transforming people's interaction ways change from 2D interaction to 3D interaction. VR technology, for example, uses head-mounted devices to simulate 3D interactive scenes in the real world. AR technology, for example, overlays various information and images into the real world through electronic devices (such as mobile phones, tablets, glasses, etc.). MR technology is between VR technology and AR technology. It uses digital technology to implement complex scenes of real-time interaction between the virtual world, the real world, and users.

In some cloud document products, the processing of scenes including multiple links or references still follows a conventional way of document processing. For example, the referenced content exists in the document in the form of a hyperlink, and a preview information is generated when a user operates to point to the hyperlink. When the user clicks to browse, the entire page jumps to the referenced content. The problems caused by this include: when the hyperlink is not pointed to and a preview is not generated, the hyperlink only has a color change difference from other content, and the user cannot accurately obtain information of the referenced content based merely on information of the hyperlink; the document content is displayed in the form of a flat projection, which jumps in a full screen when the user views the referenced content, which is easy to lose visual focus. Especially, when there are many referenced contents or a root file includes multiple links and references, it is easy to lose a link relationship between the referenced content and the root file.

The embodiments of the present disclosure propose a scheme for displaying content in a virtual scene. According to various embodiments of the present disclosure, a first reference to a second content is detected in a first content contained in a first window presented in a virtual scene; in response to detecting the first reference, in the virtual scene, the first window is presented simultaneously with presenting a second window for displaying a preview of the second content, and an indication representing an association relationship between the first reference and the second window is presented.

In this way, the embodiments of the present disclosure can improve the user's concentration when browsing information, improve the efficiency of obtaining information, and can also improve the traceability of information. Especially for XR scenes, presenting previews of referenced contents through different windows and presenting indications of association relationships can greatly help users in XR scenes to efficiently obtain information and quickly understand associations between different information.

6

Figure 1:
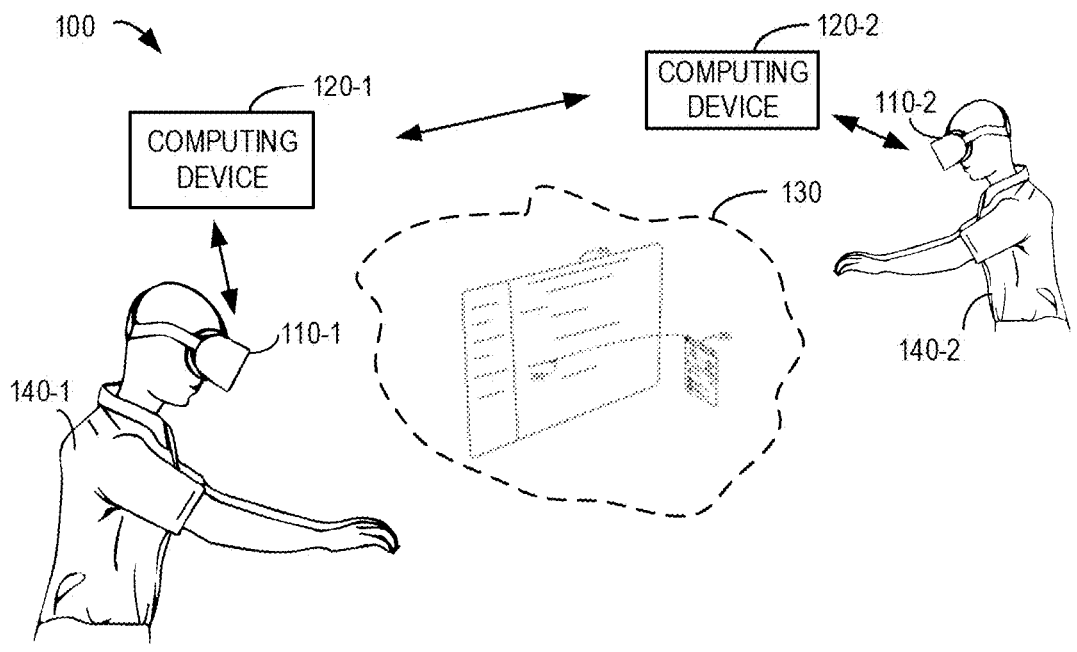
FIG. 1 illustrates a schematic diagram of example environments in which embodiments of the present disclosure may be implemented.

FIG. 1 illustrates a schematic diagram of an example environment 100 in which embodiments of the present disclosure may be implemented. In the environment 100, when there is only one user, a user 140-1 may wear a XR device 110-1. The XR device 110-1 communicates with a computing device 120-1 to construct a virtual scene for the user 140-1 or to merge virtual contents with real scenes.

In some embodiments, the environment 100 further includes, for example, a user 140-2. For example, the user 140-2 may wear a XR device 110-2. The XR device 110-2 communicates with a computing device 120-2 to construct a virtual scene for the user 140-2 or to merge virtual contents with real scenes. In this disclosure, the user 140-1 and user 140-2 are referred to individually or collectively as a user 140, the XR device 110-1 and device 110-2 are referred to individually or collectively as a XR device 110, and the computing device 120-1 and computing device 120-2 are referred to individually or collectively as a computing device 120.

In some embodiments, the computing device 120-1 and computing device 120-2 may communicate wirelessly to construct a common virtual scene for the user 140-1 and user 140-2, without limiting the users to be in the same physical space. In this disclosure, a user is also referred to as a manipulator. Virtual scenes reconstructed based on VR technology, as well as scenes where virtual content and real scenes are merged based on AR technology or MR technology, are collectively referred to as virtual scenes 130.

The XR device 110 may be a head-mounted or wearable near-eye display device, such as a head-mounted display, smart glasses, etc., supporting technologies such as VR, AR, MR, etc. The XR device 110 may include image generation components and optical display components for constructing the virtual scene 130 in a monocular or binocular field of view and displaying virtual objects. The virtual objects may include three-dimensional virtual objects and/or two-dimensional virtual objects. The virtual objects such as display blocks in the virtual scene 130. In some examples, the display block may be a two-dimensional window without thickness, which is used to load web pages, documents, etc. In some examples, display blocks are also referred to as "patches".

In some embodiments, the computing device 120 may be a separate device capable of communicating with the XR device 110 and/or other image capture devices (such as servers computing nodes, etc., for image or data processing) may also be integrated with the XR device 110 and/or other image capture devices. In some embodiments, the computing device 120 may be implemented as the XR device 110, i.e., in this case, the XR device 110 may implement all the functions of the computing device 120. It should be understood that the above description of the computing device 120 is merely exemplary and not restrictive, the computing device 120 may be implemented in various forms, structures, or categories of devices, and the embodiments of the present disclosure are not limited thereto.

It should be understood that the structure and function of the environment 100 are described for illustrative purposes only, without implying any limitation on the scope of the present disclosure.

The following will continue to describe some example embodiments of the present disclosure with reference to the accompanying drawings.

Figure 2:
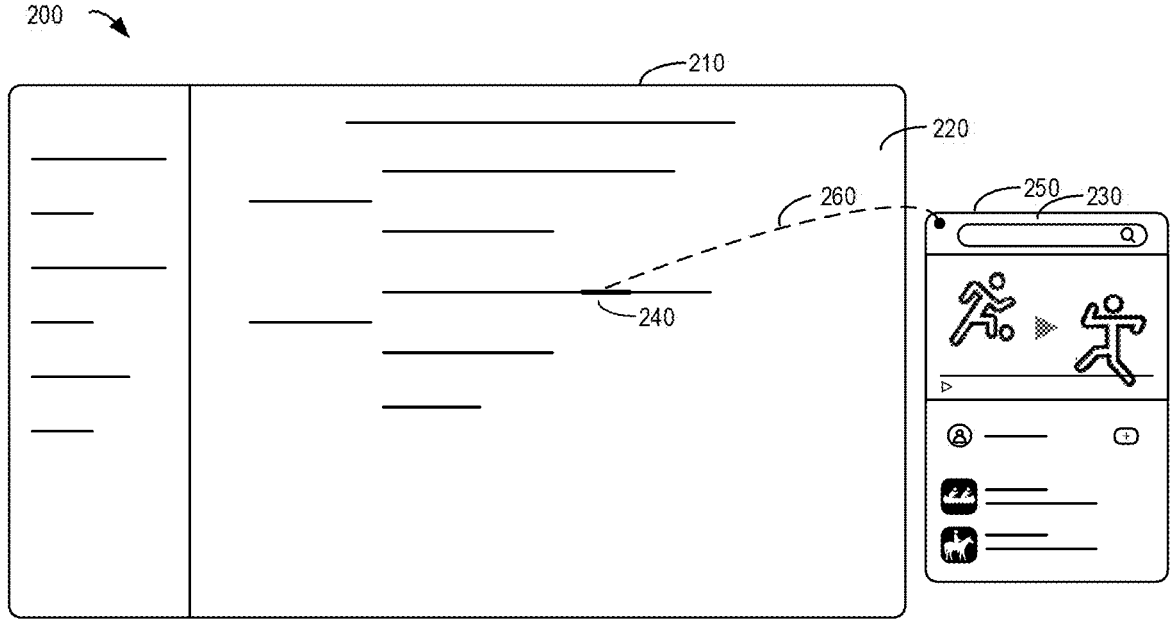
FIG. 2 illustrates a schematic diagram of an example of displaying content in a virtual scene according to some embodiments of the present disclosure.

FIG. 2 illustrates a schematic diagram of an example 200 of displaying content in a virtual scene according to some embodiments of the present disclosure. The example 200 may be implemented at the computing device 120. The example 200 is described below with reference to FIG. 1.

The virtual scene 130 includes a window 210 and a content 220 contained therein. The content 220 may include various types of information such as web pages, pictures, documents, music, videos, etc. In the present disclosure, the content 220 is also referred to as a first content.

When the computing device 120 detects that the content 220 contains a reference 240, it presents the window 210 simultaneously with presenting a window 250 in the virtual scene 130. The window 250 is used to display a preview of a content 230 parsed from the reference 240. The content 230, as a branch content referenced by the content 220, may include various types of information such as web pages, images, documents, music, and videos. In this disclosure, the content 230 is also referred to as a second content. The window 250 and window 210 are relatively and independently presented to the user, which does not hinder the user's attention to the window 210. Since the window 250 is associated with the content presented in the window 210, by presenting the content 230 associated with the main content 220 simultaneously with the present main content 220, the user may be provided richer associated content information without further manual operation of the user, effectively improving the efficiency of user obtaining information. In some embodiments, the reference 240 includes, for example, a hyperlink, if the computing device 120 detects the reference 240 in the content 220, it presents the reference 240 in a relatively outstanding manner (e.g., bold, underlined, or different colors, etc.).

The computing device 120 presents an indication 260 between the reference 240 and the window 250. The indication 260 is used to visualize an association relationship between the reference 240 and the content 230. For example, the content 230 comes from a hyperlink in the content 220. The indication 260 may also visualize an association relationship between the window 250 and the window 210. For example, the window 250 comes from a hyperlink in the window 210 and is used to load the content 230 in preview form. The indication 260 may be presented in any form, such as a thin line, a gradient line, etc. In some embodiments, the indication 260 connects the reference 240 and window 250 in the form of dashed lines, so that the reference 240 and window 250 always maintain visual relevance, thereby enhancing the intimacy and information relevance between a reference and a referenced content or a window and a referenced window and improving the efficiency of user obtaining information.

As an example, as shown in FIG. 2, the window 210 is a parent window and the window 250 is a sub-window. The content 220 is a root content and the content 230 is a branch content. The reference 240 is a hyperlink. The computing device 120 monitors the root content loaded in the parent window. If there are no hyperlinks in the root content, the computing device 120 displays the root content in the form of pure document in the parent window. if a hyperlink is included in the root content, the computing device 120 automatically displays the sub-window and the branch content near the parent window in the form of a floating window, and always displays the indication line between the hyperlink and the sub-window. Thus, the user 140 may easily switch the visual focus between the parent window and the sub-window.

In the virtual scene based on XR technology, other windows and indications between windows associated with the content in a window are presented, realizing the visualization of association relationships in three-dimensional space. In the two-dimensional plane, the link preview information often blocks a part of the content displayed by the current window. Therefore, compared with the link preview information in the two-dimensional plane, the display effect of the present implementation is more intuitive, significantly improving the efficiency of obtaining information, and improving the traceability of information.

In some embodiments, the computing device 120 adjusts a second position of the second window to be displayed according to a relative position of the first reference in the first window, so that when the user 140 switches the line of sight between windows, the visual focus is shifted as much as possible to improve the efficiency of obtaining information. As an example, as shown in FIG. 2, the computing device 120 adjusts the display position of the window 250 according to the relative position of the reference 240 in the window 210. If the reference 240 is located near the upper frame of the window 210, the computing device 120 controls the window 250 to be displayed at a position on the right upper side of the window 210; if the reference 240 is approximately located in the center of the window 210, the computing device 120 controls the window 250 to be displayed at a position on the right center of the window 210. Additionally or alternatively, the computing device 120 sets the second position adjustable range based on the first position, and controls the second window to be fully displayed within this range. This prevents the user 140 from reducing the efficiency of obtaining information due to the size of the second window being too large or the position of the lower frame being too low after the user 140 switching his/her line of sight to the second window.

In some embodiments, the first and second windows are presented with an angle. The computing device 120 may control the first and second windows to be presented with an angle according to predetermined conditions. The predetermined conditions include an angle between the first and second windows, so that the user 140 may browse the contents of the first window from a global perspective and easily switch the line of sight between the first and second windows. The predetermined conditions further include, for example, the distance between the first and second windows, to ensure that the windows are maintained at a distance, independently displayed, and easy for the users to browse. The predetermined conditions further include, for example, a relative position of the second window relative to the first window in front or behind, thereby increasing or decreasing the attention of the window 250.

FIGS. 3A to 3D illustrate schematic diagrams of examples 300A, 300B, 300C, and 300D of presenting the first and second windows according to some embodiments of the present disclosure. The example 300A to the example 300D may be implemented at the computing device 120. The example 300A to the example 300D are described below with reference to FIG. 1.

Figure 3A:
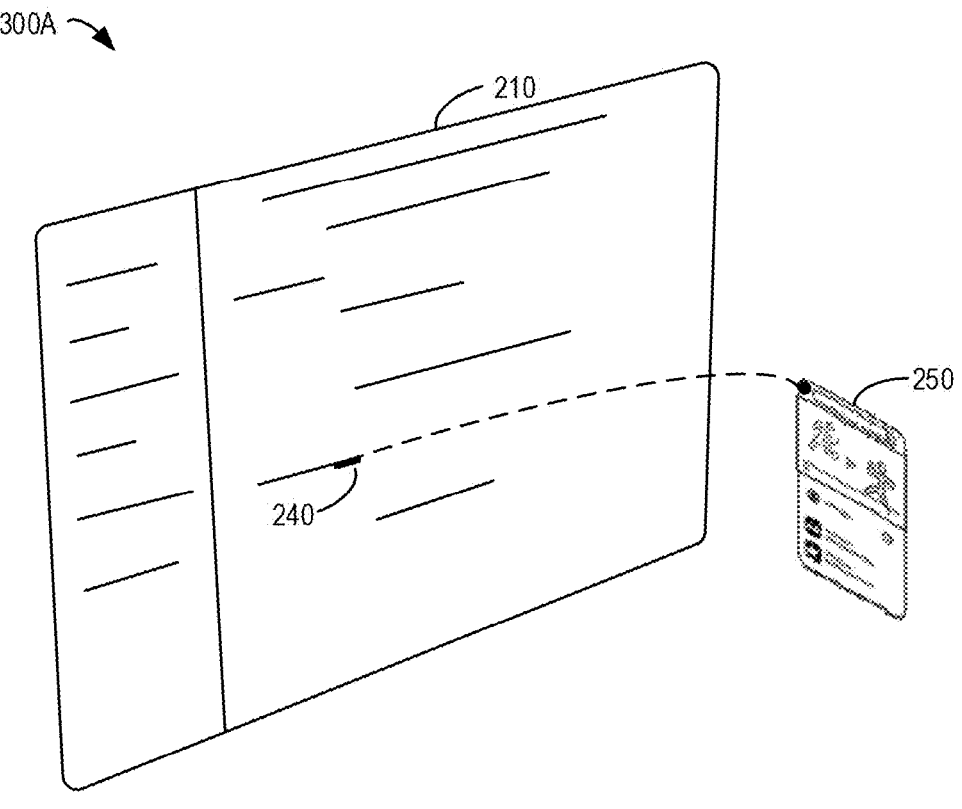

As shown in FIG. 3A, the computing device 120 detects that a content loaded by the window 210 includes the reference 240, thereby controlling the window 250 to be presented on the right side of the window 210 in the form of a floating window, and always displaying an indication line representing an association relationship. For convenience of description, a ground plane in the virtual scene is taken as a XZ plane of a coordinate system, and a direction perpendicular to the XZ plane is a Y direction. Assuming that a plane where the window 210 is located and a plane where the window 250 is located are both perpendicular to the XZ plane.

As an example, the window 250 is displayed on the right front of the window 210 (a side of the window 210 facing the user is the front, and a side opposite to the user's right hand is the right front). As shown in FIG. 3B, a projection 210' of the window 210 on the XZ plane and a projection 250' of the window 250 on the XZ plane have an obtuse angle. A projection 210" of the window 210 on the XY plane overlaps with a projection 250" of the window 250 on the XY plane. The window 250 is displayed at a position relatively close to the user 140, thereby improving the presence of sub-windows in a more outstanding way.

As an example, the window 250 is displayed on the right rear of the window 210 (a side of the window 210 facing away from the user is the rear, and a side opposite to the user's right hand is the right rear). As shown in FIG. 3C, a projection 210' of the window 210 on the XZ plane and a projection 250' of the window 250 on the XZ plane have an obtuse angle. A projection 210" of the window 210 on the XY plane overlaps with a projection 250" of the window 250 on the XY plane. The window 250 is displayed at a position relatively far from the user 140, thereby reducing the presence of sub-windows.

Figure 3D:
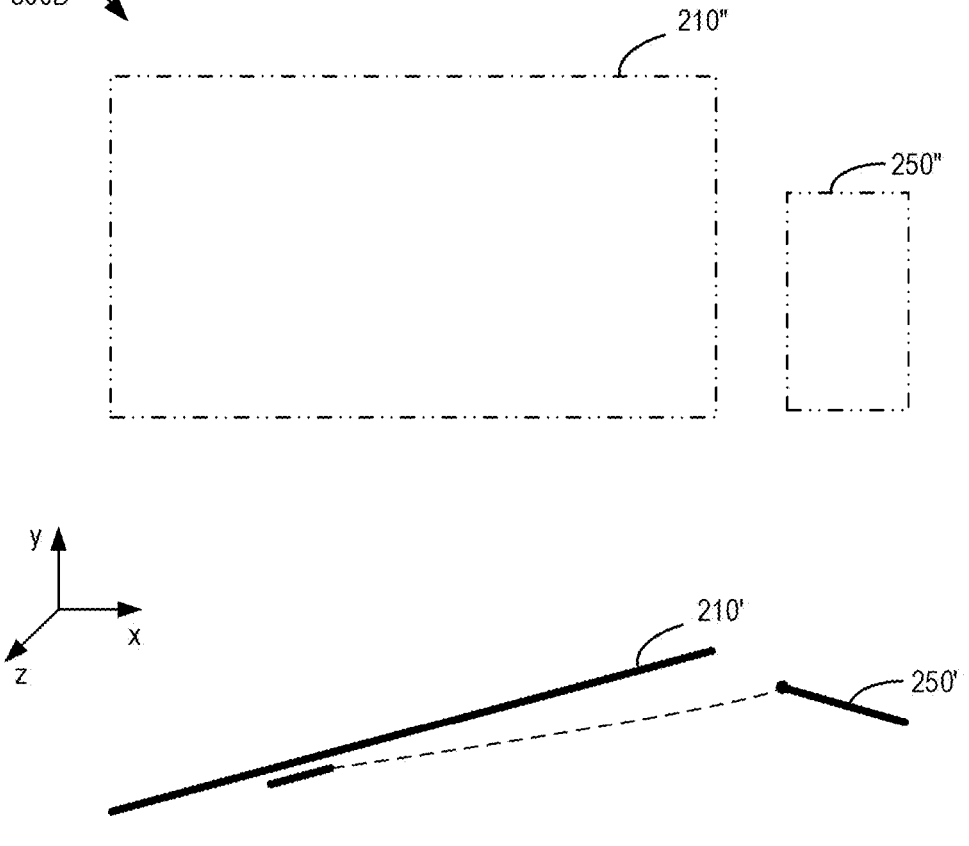

As an example, the window 250 is displayed on the right side of the window 210. As shown in FIG. 3D, the angle between the projection 210' of window 210 on the XZ plane and the projection 250' of the window 250 on the XZ plane is obtuse. The projection 210" of the window 210 on the XY plane does not overlap with the projection 250" of the window 250 on the XY plane. Therefore, it may attract the users' attention to the window 250 in an appropriate way without too distracting them from the window 210.

The above illustrates a plurality of example embodiments of layout of the first window and the second window. It should be understood that the second window may be presented on the left side, left front, or left rear of the first window. The beginning, end, length and style of the indication between the second window and its corresponding reference may be adaptively adjusted based on the layout of the first window and the second window.

In some embodiments, the computing device 120 determines a position of a virtual avatar corresponding to the user 140 in the virtual scene 130, and then to present the second window based on the position of the virtual avatar. The ways in which the computing device 120 presents the second window include adjusting an orientation or a distance of the second window relative to the virtual avatar to improve the recognition of the content in the second window by the user 140.

Figure 4A:
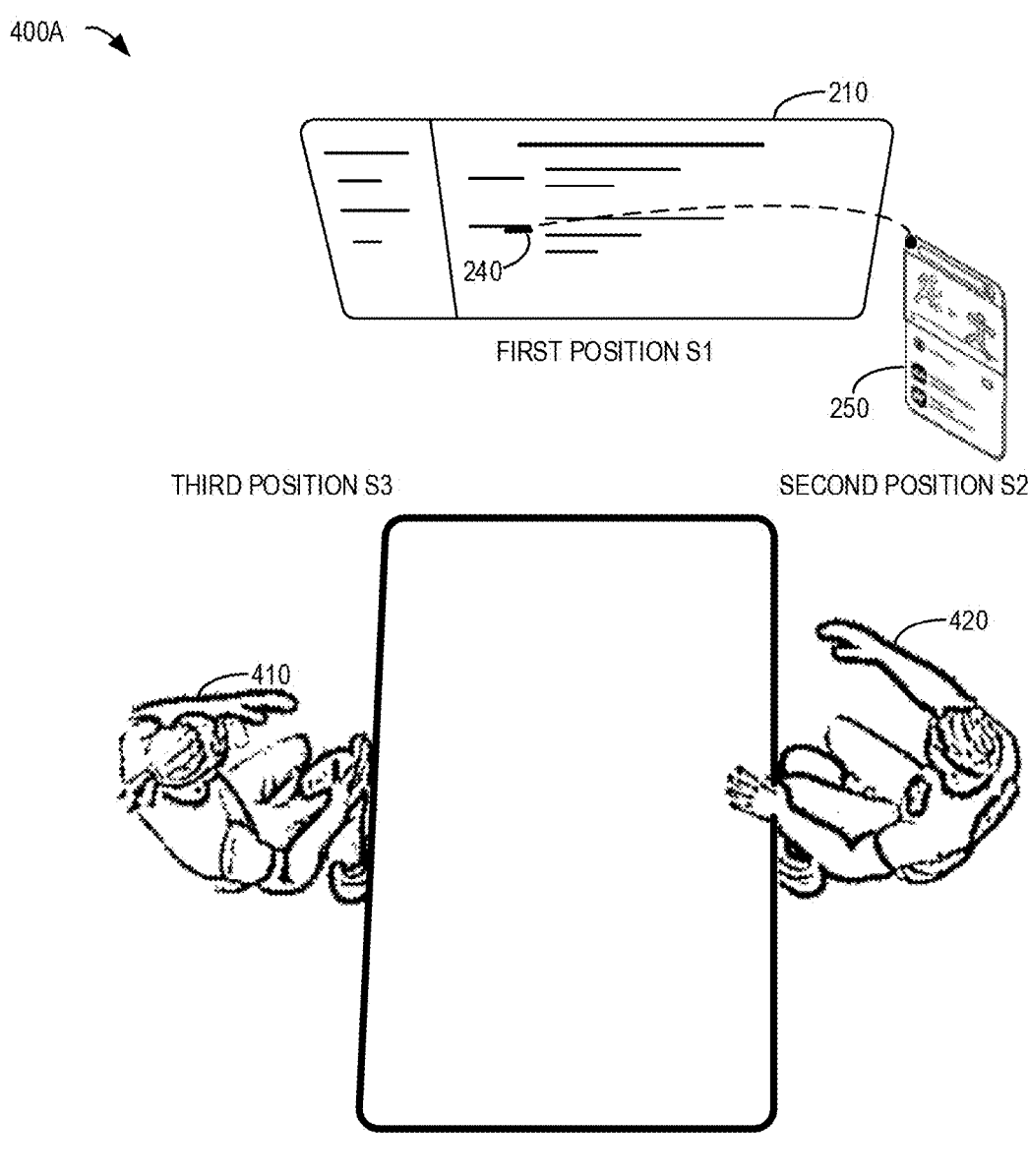
FIGS. 4A to 4C illustrate schematic diagrams of multiple examples of presenting styles of the first and second windows according to some embodiments of the present disclosure.

FIG. 4A illustrates a schematic diagram of an example 400A of presenting a window based on a position of a virtual avatar according to some embodiments of the present disclosure. The example 400A may be implemented at the computing device 120. The example 400A is described below with reference to FIG. 1.

When there is only one user in environment 100, a virtual avatar corresponding to the user 140-1 is a virtual avatar 410. The computing device 120 controls the window 210 to be presented in front of the virtual avatar 410. For example, the computing device 120 maintains the orientation of the window 210 and adjusts the angle between the window 250 and the window 210 based on a position of the virtual avatar 410, so that the window 250 faces the virtual avatar 410. As another example, the computing device 120 maintains the orientation of the window 210 and adjusts a distance between the window 250 and the virtual avatar 410 based on the position of the virtual avatar 410, so that the window 250 is close to the virtual avatar 410.

When the environment 100 further includes the user 140-2, a virtual avatar corresponding to the user 140-2 is a virtual avatar 420. The computing device 120 controls the window 210 to be presented in front of the virtual avatar 410 and the virtual avatar 420. The computing device 120 maintains the orientation of the window 210 unchanged and adjusts the angle between the window 250 and the window 210 or the distance between the window 250 and the virtual avatar 410 based on the position of the virtual avatar 410 to improve the recognition of the content in the window 250 by the user 140-1. Similarly, the computing device 120 adjusts the angle between the window 250 and the window 210 or the distance between the window 250 and the virtual avatar 420 based on a position of the virtual avatar 420 to improve the recognition of the content in the window 250 by the user 140-2. Therefore, the computing device 120 adjusts the orientation and/or relative distance of the second window according to the position of each virtual avatar, and such adjustments are only visible to the virtual avatar.

As an example, when the environment 100 includes two users, the computing device 120 determines the position of the virtual avatar 410 and the position of the virtual avatar 420, and then adjusts, based on an middle position of the two positions, the orientation of the window 250 and/or distance relative to the middle position. When the environment 100 includes multiple users, the computing device 120 determines the position of each virtual avatar, and then determines a central position based on these positions, and then adjusts the orientation of the window 250 and/or the distance relative to the central position based on the central position.

In some embodiments, when the number of users in the environment 100 or the position changing of the virtual avatar corresponding to the user, the computing device 120 re-determines a presentation style of the window 250 and adjusts it at a predetermined speed to avoid adjusting the speed too fast, causing screen jitter or user discomfort.

If the computing device 120 does not detect that the user 140 performs an activation operation on the second window, the computing device 120 presents the first window in a visually relatively outstanding style (e.g., highlighted), and presents the second window in a visually relatively non-outstanding style (e.g., grayscale display). If the computing device 120 detects that the user 140 performs the activation operation on the second window, that is, the visual focus of the user 140 switches from the first window to the second window, the computing device 120 adjusts the presentation styles of the first window and the second window, so that the second window is visually more outstanding than the first window. For example, the computing device 120 presents (e.g.,) the second window in a highlighted way, and presents (e.g.,) the first window in a grayscale display way, thereby realizing the display of the window and its content that follows the visual focus of the user 140.

The presentation style of window includes, for example, effects of adjusting one or more parameters such as a position, a size, a color, a brightness, and a contrast of the window. Additionally or alternatively, the presentation styles of window further include presentation styles of its loaded content, such as the effect of adjusting one or more parameters such as a font, a font size, a color, a brightness, a contrast, and a display style of images or videos in the content. In this disclosure, the visually outstanding style is also referred to as a second style, and the visually non-outstanding style is also referred to as a first style. The activation operation on the second window is also referred to as a first activation operation.

In some embodiments, the first activation operation includes a predetermined operation on the second window or the first reference in the first window. The predetermined operation includes, for example, single-clicking, double-clicking, multi-clicking, sliding, zooming, pinching, etc. As an example, in a virtual scene constructed by a VR device, referring to FIG. 4A, the user 140-1 activates the window 250 by clicking on the window 250 or the reference 240 in the window 210 through the corresponding virtual avatar 410. As an example, in a virtual scene constructed by an AR device where virtual contents and real scenes are merged, the user 140 directly clicks on the window 250 or the reference 240 in the window 210 with a finger, thereby activating window 250.

In some embodiments, referring to FIG. 4A, the computing device 120 controls the window 210 to be initially displayed at a first position S1 in the virtual scene 130, and controls the window 250 to be initially displayed at a second position S2 in the virtual scene 130. For example, the computing device 120 presents the window 210 at a position in front of the virtual avatar corresponding to the user 140. The computing device 120 monitors the content loaded in the window 210. When the reference 240 appears in the content, the computing device 120 automatically displays the window 250 and its content on the right side of the window 210 in the form of a floating window. It should be understood that the first position S1 and the second position S2 may represent a center position (or other preset position) of the window or a display region where the window is located.

In some embodiments, after the computing device 120 detects the activation operation on the second window by the user 140, it switches the first window from the first position S1 to be presented at a third position S3 in the virtual scene and switches the second window from the second position S2 to be presented at the first position S1 in the virtual scene. It should be understood that the first position, the second position, and the third position may be represented by a coordinate position of a certain point in the virtual space, or a region range represented in the virtual space. Exemplarily, the computing device 120 may control the window to change the position with effects such as sliding, bouncing, disappearing, and reappearing, so that the window switches from one position to be presented at another position. Similarly, the third position may represent a center position (or other predetermined position) of the window or the display region where the window is located.

Figure 4B:
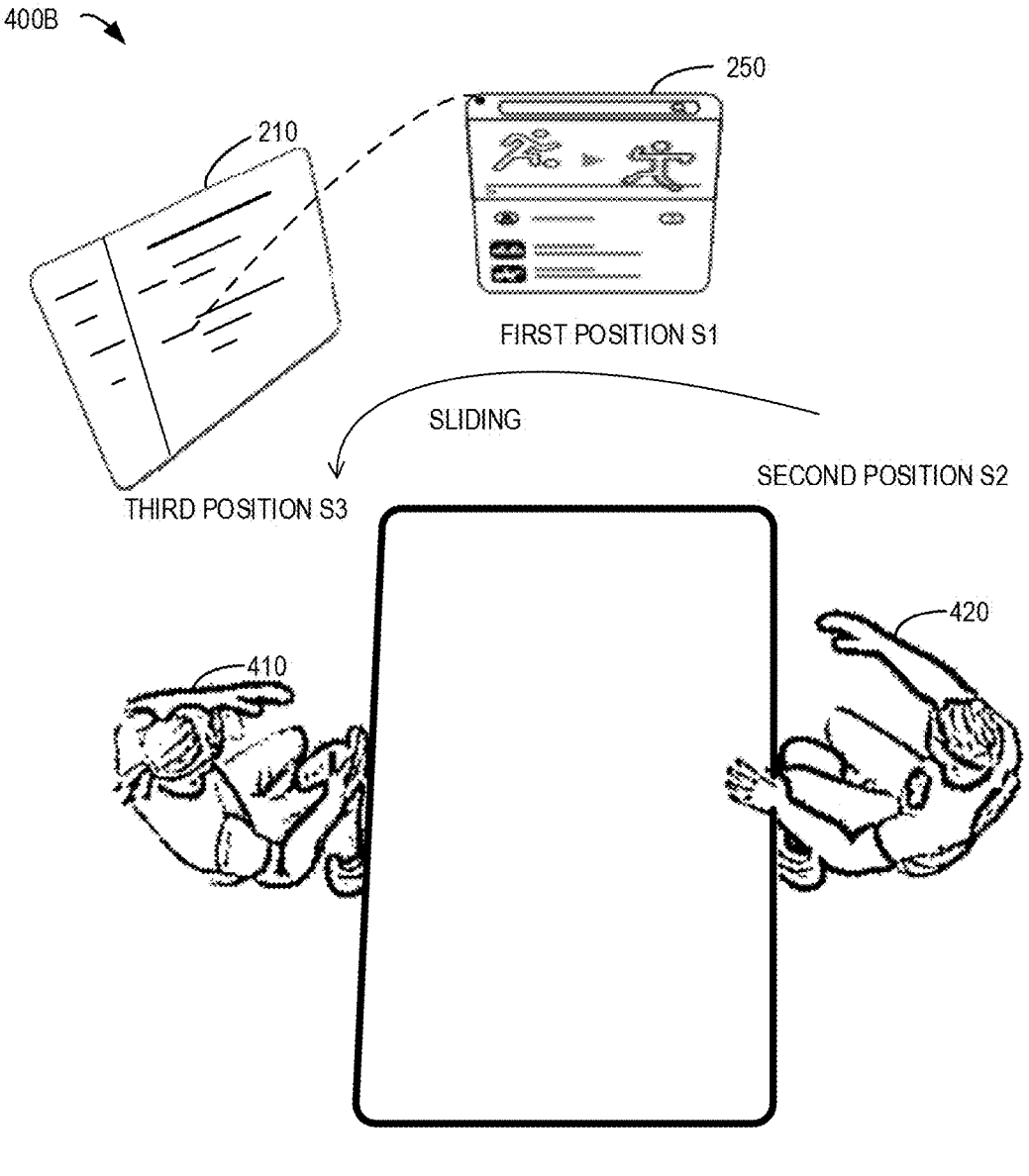
Figure 4C:
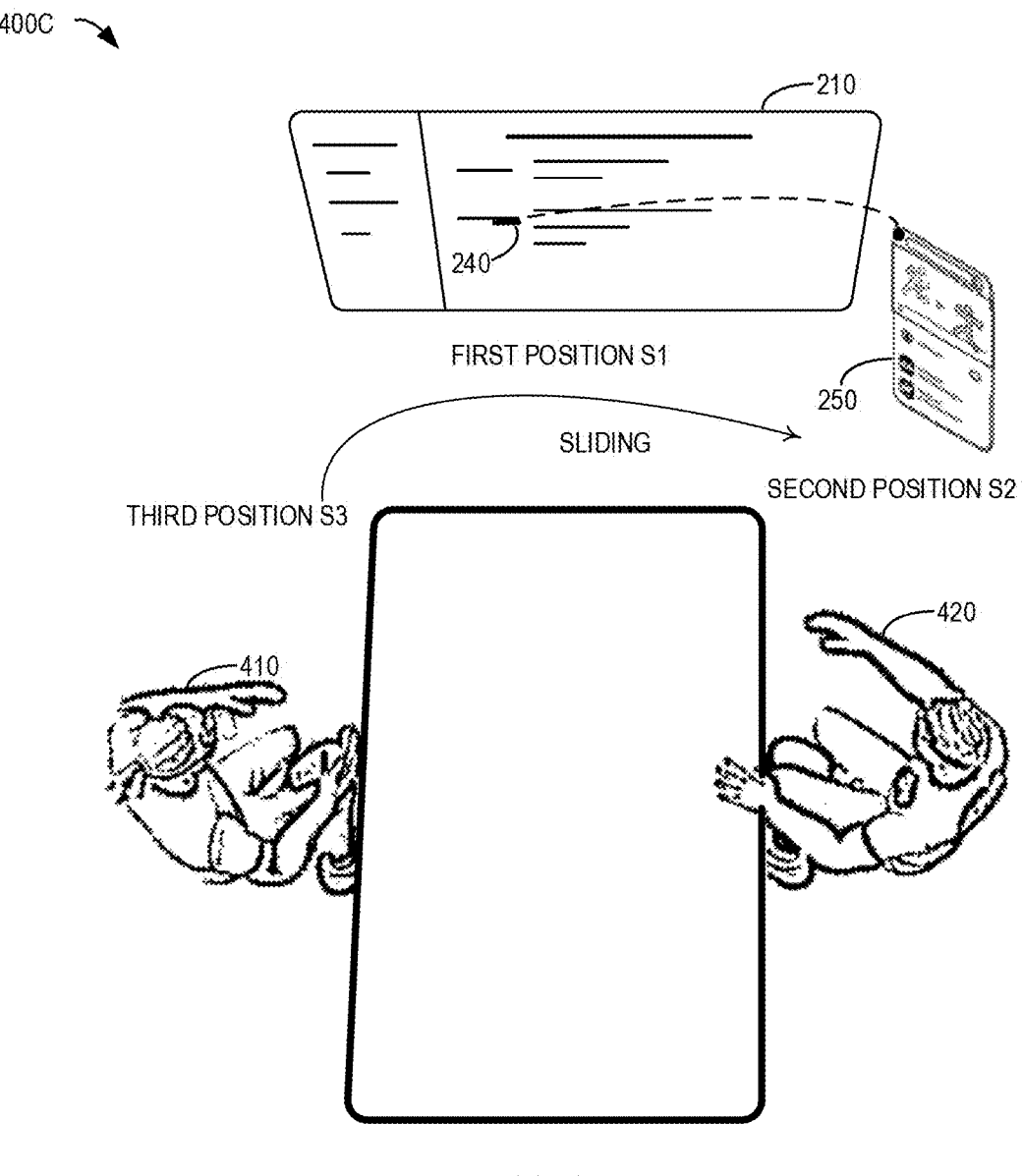

FIGS. 4B and 4C illustrate schematic diagrams of an example 400B and example 400C of changing a presentation style of a window according to some embodiments of the present disclosure. The examples 400B and 400C may be implemented at the computing device 120. The examples 400B and 400C are described below with reference to FIG. 1.

As an example, referring to FIG. 4A, the computing device 120 controls the window 210 to be initially displayed at the first position S1, and controls the window 250 to be initially displayed at the second position S2. Referring to FIG. 4B, when the computing device 120 detects, for example, that the user 140-1 performs the activation operation on the window 250 through the corresponding virtual avatar 410, it means that the focus of attention of the user 140-1 is moved from the window 210 to the window 250. To highlight the window 250 and improve the user's recognition of the content in the window, the computing device 120 controls the window 210 to slide from the first position S1 to the third position S3 and controls the window 250 to slide from the second position S2 to the first position S1. Additionally or alternatively, the computing device 120, based on an operation gesture of the user, such as a right-to-left sliding gesture, slides the window 210 from the first position S1 to the third position S3 and slides the window 250 from the second position S2 to the first position S1.

In some embodiments, if the computing device 120 detects the user 140 selects the first window, it switches the first window from the third position to be presented at the first position S1 in the virtual scene 130 and switches the second window from the first position S1 to be presented at the second position S2 in the virtual scene 130. That is, when the focus of attention of the user 140 returns to the first window, the first window and the second window return to the initial positions.

As an example, referring to FIG. 4B, the computing device 120 controls the window 210 to be displayed at the third position S3 and controls the window 250 to be displayed at the second position S2, illustrating that the current focus of attention of the user 140 is on the window 250. Referring to FIG. 4C, the computing device 120 detects the selection for the window 210 by the user 140, illustrating that the focus of attention of the user 140 is moved from the window 250 to the window 210. The computing device 120 controls the window 210 to slide from the third position S3 to the first position S1 and controls the window 250 to slide from the first position S1 to the second position S2. Additionally or alternatively, the computing device 120, based on an operation gesture, such as a left-to-right sliding gesture, restores the window 210 from the third position S3 to the initial position and restores the window 210 from the first position S1 to the initial position.

In some embodiments, if the computing device 120 detects a second reference to a third content contained in the second content, it presents the first and second windows simultaneously with presenting a third window and an indication representing an association relationship between the second reference and the third window in the virtual scene. The third window is used to display a preview of the third content parsed from the second reference. The third content, as a branch content of the second content, may include various types of information such as web pages, pictures, documents, music, and videos. Additionally or alternatively, the third and first windows are presented with an angle, and the computing device 120 adjusts one or more of: the angle, a distance, or a relative position of the third and first windows based on the position of the virtual avatar.

FIGS. 5A to 5D illustrate schematic diagrams of an example 500A, example 500B, example 500C, and example 500D of presenting positions of a plurality of windows according to some embodiments of the present disclosure. The example 500A to example 500D may be implemented at the computing device 120. A virtual avatar corresponding to the user 140-1 is a virtual avatar 410, a virtual avatar corresponding to the user 140-2 is a virtual avatar 420, and the user 140-1 and user 140-2 are individually or collectively referred to as the user 140. The examples 500A to 500D are described below with reference to FIG. 1.

Figure 5A:
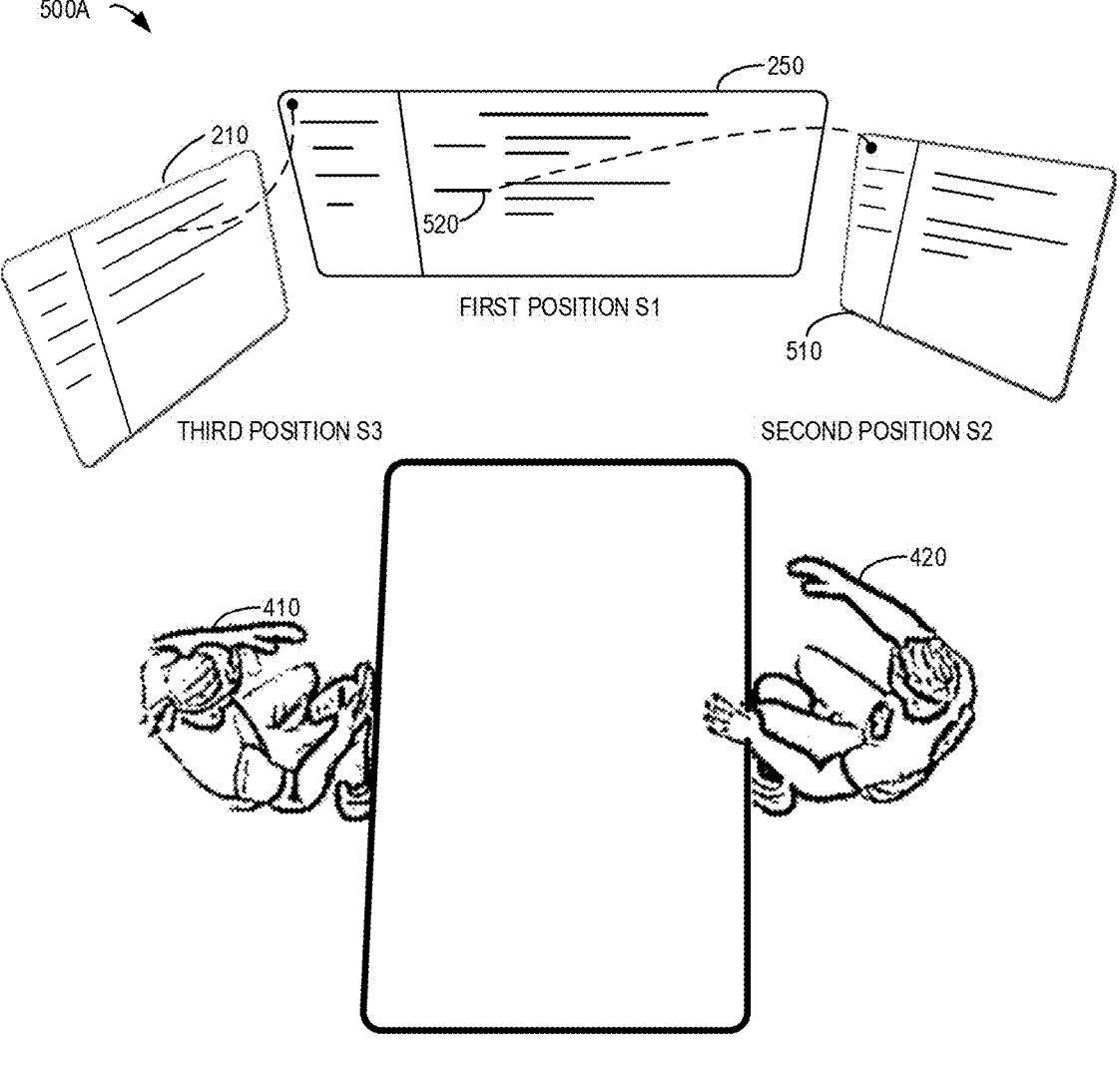

As an example, referring to FIG. 5A, the computing device 120 controls the window 210 to be displayed at the third position S3 in the virtual scene 130, and controls the window 250 to be displayed at the first position S1 in the virtual scene 130. The computing device 120 monitors the content loaded in the window 250. When there is a reference 520 in the content, the computing device 120 automatically displays the window 510 and its contents at the second position S2 on the right side of the window 250 in the form of a floating window, and always displays the indication line from the reference 520 to the window 510.

In some embodiments, if the computing device 120 detects a second activation operation on the third window by the user 140, it presents the third window in the first style, and presents the fourth window in the second style. The first window is at least partially overlapped with the second window. The second activation operation comprises a predetermined operation on the third window or the second reference to the second window. The predetermined operation includes, for example, single-clicking, double-clicking, multi-clicking, sliding, zooming, pinching, etc.

Figure 5B:
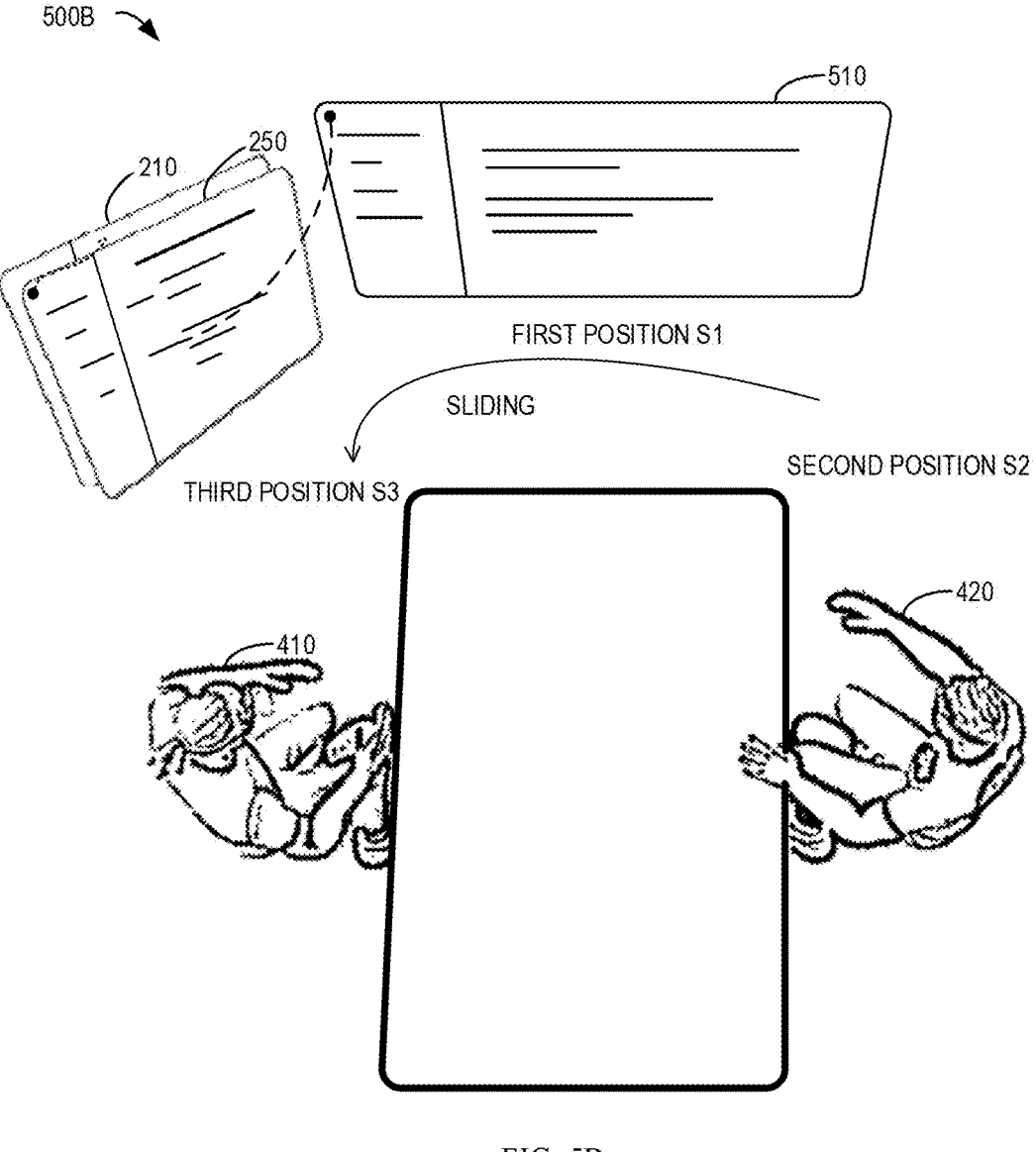

As an example, referring to FIGS. 5A and 5B, when the computing device 120 detects that the user 140 performs the activation operation on the window 510 through the corresponding virtual avatar, it is illustrated that the focus of attention of the user 140 is moved from the window 250 to the window 510. To highlight the window 510 and improve the user's recognition of the content in the window 510, the computing device 120 controls the window 250 to slide from the first position S1 to the third position S3 and to be arranged in front of the window 210 (for example, causing the window 250 to cover at least a portion of the window 210). The computing device 120 controls the window 510 to slide from the second position S2 to the first position S1. Additionally or alternatively, the computing device 120, based on the operation gesture of the user, such as a right-to-left sliding gesture, slides the window 250 from the first position S1 to the third position S3 and slides the window 510 from the second position S2 to the first position S1. Additionally or alternatively, the computing device 120 moves the first window 210 a predetermined distance away from the avatar direction, and then slides the window 250 to the third position S3.

In some embodiments, if the computing device 120 detects that the content of a window contains a plurality of references, it controls the display of the window corresponding to the plurality of references that at least partly overlap, and if it detects the activation operation on one of the windows, moves the windows in the same style.

In some embodiments, if it also detects a third reference to the fourth content in the first content, the computing device 120 presents the first window and the second window simultaneously with a fourth window and an indication representing an association relationship between the third reference and the fourth window. The fourth window is used for displaying a preview of the fourth content.

Figure 5C:
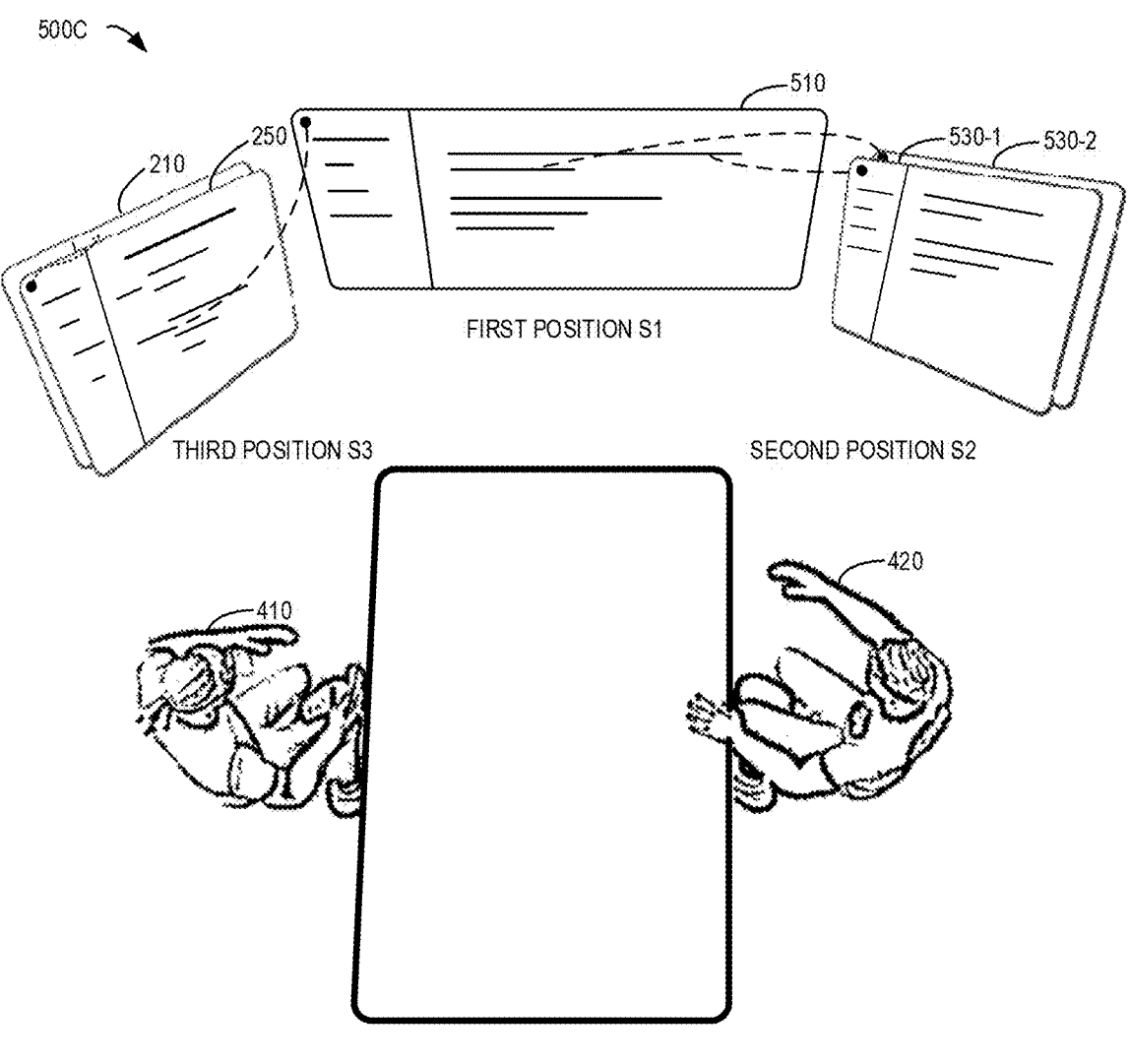

As an example, referring to FIG. 5C, the computing device 120 controls the window 210 and window 250 to be displayed at the third position S3 in the virtual scene 130, and controls the window 510 to be displayed at the first position S1 in the virtual scene 130. The computing device 120 monitors the content loaded in the window 510. When there are a plurality of references in the content, such as two references, the computing device 120 automatically displays the windows 530-1 and 530-2 in the form of a floating window on the right side of the window 510 and displays the indication lines of the respective references to the respective windows.

In some embodiments, the second window and the fourth window are presented in an overlapping style, so that the contents of the windows have a sufficient display size, thereby improving the efficiency of the user obtaining information.

In the example of FIG. 5C, based on the order of the reference positions, the computing device 120 controls the window 530-2 to be arranged behind the window 530-1.

In some embodiments, the first window is initially displayed at the first position in the virtual scene, the computing device 120 in response to an activation operation on at least one of the second window and the fourth window, switching the second window and the fourth window to be presented at the first position in the virtual scene in an overlapping style or a tiling style. In some embodiments, the first position being in the overlapping style or tiling style may depend on a number, a window size and other factors for a set of windows to be switched (including the second window and the fourth window).

For example, if only the second window and the fourth window are to be switched, the switched second window and the fourth window may be presented at the first position in a tiling style. Conversely, if the window to be switched also includes other windows other than the second window and the fourth window, the switched multiple windows may be presented at the first position in the overlapping style. In this case, a window with the highest display priority among the multiple windows overlapped and displayed at the first position may be, for example, a specific window activated by the user.

Figure 5D:
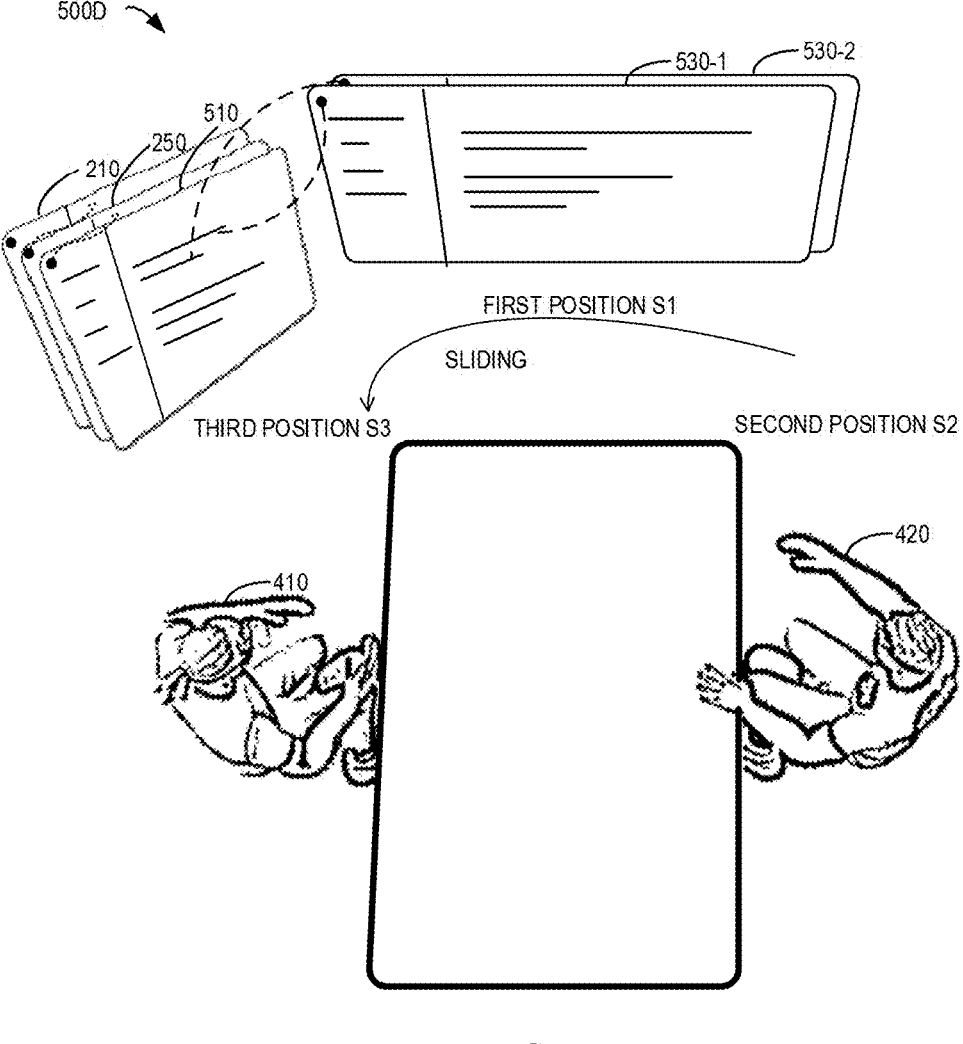

Referring to FIGS. 5C and 5D, if the computing device 120 detects the activation operation on the window 530-1 by the user 140 through the corresponding virtual avatar, it controls the window 510 to slide from the first position S1 to the third position S3, and to be arranged in front of the window 210 and window 250. The computing device 120 controls the windows 530-1 and 530-2 to slide from the second position S2 to the first position S1, and the two windows being displayed in the overlapping style. In some other embodiments, the first position S1 represents a display region, and the computing device 120 controls the windows 530-1 and 530-2 to be arranged in the tiling style.

The computing device 120 controls the window 530-1 and window 530-2 to move at the same time. The computing device 120 may maintain a relative position of the two windows unchanged or control the activated window to be preferentially presented. The user 140 may switch the positions of the two windows by clicking, dragging, and other operations.

In some embodiments, the computing device 120 may switch only the display position of the activated window, without changing the display position of the inactivated window.

Thus, the computing device 120 realizes the associated arrangement and flexible movement of a plurality of windows in a multi-link or multi-reference scene and provides visual traceability information.

In some embodiments, the computing device 120 determines the first style and the second style based on a predetermined Field of View (FoV) range. The predetermined field of view range refers to a specific region or a specific range of the current user's field of view in the virtual scene. The first style includes a position of the first window, and the second style includes a position of the second window.

FIG. 6 illustrates a schematic diagram of an example of a predetermined field of view range according to some embodiments of the present disclosure 600. The example 600 may be implemented at the computing device 120. The example 600 is described below with reference to FIGS. 1 and 3.

As an example, in a virtual scene constructed by a VR device, the computing device 120 loads a predetermined field of view range based on the position of the virtual avatar of the user 140. A view of the user 140 is a spatial range that may be seen by the eyes when the head and eyeballs are fixed, usually represented by angles. The predetermined field of view range is less than or equal to the view of the user 140. To avoid interfering with the user 140's attention, boundary lines of the predetermined field of view range are not visible to the user 140. The predetermined field of view range includes a main visual region 610 and an auxiliary visual region 620. The main visual region 610 is a focal range for human eyes, for example, with the visual center as a center point, within a range of 30° to the left and right in the horizontal direction, and 30° to the top and bottom of the vertical direction. The auxiliary visual region 620 is used to display some auxiliary information, such as a range from −60° to −30° and from +30° to +60° in the horizontal direction, and from −70° to −30° and from +30° to +50° in the vertical direction. To highlight the window 210, the computing device 120 controls the window 210 to be displayed in the main visual region 610. In order to display the window 250 without distracting the user 140, the computing device 120 controls window 250 to be displayed in the auxiliary visual region 620. Additionally or alternatively, the computing device 120 adjusts the angle between the window 210 and window 250 based on a scaling ratio of the window 210 and window 250, so that the window 210 is displayed in the main visual region 610 and the window 250 is displayed in the auxiliary visual region 620.

In summary, according to various embodiments of the present disclosure, the computing device 120 may parse the references in the window in advance, automatically display those in the form of a floating window next to the referenced content and give clear connection lines to indicate the referenced portions. Further, in the scene of multiple links or multiple references, the associated arrangement and movement of multiple windows are realized, and the visual reference relationship is always maintained and supplemented by the connection line to explain the reference position of the window content, thereby providing visual information traceability. Furthermore, the parent window is always maintained within the user's view, and the user may switch back to the parent window at any time or restore the parent window and each sub-window to the initial style, improve the efficiency of user obtaining information, do not interrupt a main path of user browsing information, and improve the user's concentration when browsing information.

FIG. 7 illustrates a flowchart of a process 700 of displaying content in a virtual scene according to some embodiments of the present disclosure. The process 700 may be implemented at the computing device 120. The process 700 is described below with reference to FIG. 1.

At block 710, the computing device 120 detects a first reference to a second content in a first content contained in a first window presented in a virtual scene.

At block 720, the computing device 120 in response to detecting the first reference, in the virtual scene: presenting the first window simultaneously with presenting a second window for displaying a preview of the second content; and presenting an indication representing an association relationship between the first reference and the second window.

In some embodiments, the first window and the second window are presented with an angle.

In some embodiments, to present the second window, the computing device 120 determines a position of a virtual avatar corresponding to a current user of the virtual scene in the virtual scene; and presents the second window based at least in part on the position of the virtual avatar.

In some embodiments, the computing device 120 in response to a first activation operation on the second window, presents the first window in a first style and presenting the second window in a second style, the second style being visually more outstanding than the first style.

In some embodiments, the first window is initially displayed at a first position in the virtual scene, and the second window is displayed at a second position in the virtual scene, in order to present the first window in the first style, the computing device 120 switches the first window from the first position to a third position in the virtual scene; in order to present the second window in the second style, the computing device 120 switches the second window from the second position to be presented at the first position in the virtual scene.

In some embodiments, the computing device 120 in response to a selection for the first window, switches the first window from the third position to be presented at the first position in the virtual scene; and switches the second window from the first position to be presented at the second position in the virtual scene.

In some embodiments, the first activation operation comprises a predetermined operation on the second window or on the first reference in the first window.

In some embodiments, the computing device 120 in response to detecting a second reference to a third content contained in the second content, presents the first window and the second window simultaneously with presenting a third window for displaying a preview of the third content; and presents an indication representing an association relationship between the second reference and the third window.

In some embodiments, the computing device 120 in response to a second activation operation on the third window, presenting the third window in the first style, and presenting the fourth window in the second style, the first window being at least partially overlapped with the second window.

In some embodiments, the first style and the second style are determined based on a predetermined field of view range.

In some embodiments, a third reference to a fourth content is detected in the first content, the computing device 120 presents the first window and the second window simultaneously with presenting a fourth window for displaying a preview of the fourth content; and presents an indication representing an association relationship between the third reference and the fourth window.

In some embodiments, the second window and the fourth window are presented in an overlapping style.

In some embodiments, the first window is initially displayed at a first position in the virtual scene, the computing device 120 in response to an activation operation on at least one of the second window and the fourth window, switches the second window and the fourth window to be presented at the first position in the virtual scene in an overlapping style or a tiling style.

FIG. 8 a block diagram of an apparatus 800 for displaying content in a virtual scene according to some embodiments of the present disclosure. The apparatus 800 may be implemented or included in the computing device 120. The various modules/components in the apparatus 800 may be implemented by hardware, software, firmware, or any combination thereof.

As shown, the apparatus 800 includes a detection module 810 configured to detect a first reference to a second content in a first content contained in a first window presented in a virtual scene. The apparatus 800 further includes a first presentation module 820 configured to in response to detecting the first reference, in the virtual scene: present the first window simultaneously with presenting a second window for displaying a preview of the second content; and present an indication representing an association relationship between the first reference and the second window.

In some embodiments, the first window and the second window are presented with an angle.

In some embodiments, the apparatus 800 further comprises: a determination module configured to determine a position of a virtual avatar corresponding to a current user of the virtual scene in the virtual scene; wherein the first presentation module 820 is further configured to present the second window based at least in part on the position of the virtual avatar.

In some embodiments, the apparatus 800 further comprises: a second presentation module configured to in response to a first activation operation on the second window, present the first window in a first style and presenting the second window in a second style, the second style being visually more outstanding than the first style.

In some embodiments, the first window is initially displayed at a first position in the virtual scene, and the second window is displayed at a second position in the virtual scene, wherein the second presentation module is further configured to: switch the first window from the first position to a third position in the virtual scene; and switch the second window from the second position to be presented at the first position in the virtual scene.

In some embodiments, the apparatus 800 further comprises: a sliding module configured to in response to a selection for the first window, switch the first window from the third position to be presented at the first position in the virtual scene; and switch the second window from the first position to be presented at the second position in the virtual scene.

In some embodiments, the first activation operation comprises a predetermined operation on the second window or on the first reference in the first window.

In some embodiments, the apparatus 800 further comprises: a third presentation module configured to in response to detecting a second reference to a third content contained in the second content, present the first window and the second window simultaneously with presenting a third window for displaying a preview of the third content; and present an indication representing an association relationship between the second reference and the third window.

In some embodiments, the apparatus 800 further comprises: a fourth presentation module configured to in response to a second activation operation on the third window, present the third window in the first style, and presenting the fourth window in the second style, the first window being at least partially overlapped with the second window.

In some embodiments, the first style and the second style are determined based on a predetermined field of view range.

In some embodiments, a third reference to a fourth content is detected in the first content, the apparatus 800 further comprises: a fifth presentation module configured to present the first window and the second window simultaneously with presenting a fourth window for displaying a preview of the fourth content; and present an indication representing an association relationship between the third reference and the fourth window.

In some embodiments, the second window and the fourth window are presented in an overlapping style.

In some embodiments, the first window is initially displayed at a first position in the virtual scene, the apparatus 800 further comprises: a switching module configured to in response to an activation operation on at least one of the second window and the fourth window, switch the second window and the fourth window to be presented at the first position in the virtual scene in an overlapping style or a tiling style.

As mentioned briefly earlier, in virtual scenes of XR products, a display way of functional regional greatly affects the efficiency and interactive experience of users obtaining information. XR technology includes virtual reality technology (VR), augmented reality technology (AR), and mixed reality technology (MR). XR technology uses hardware devices combined with various software technology means to present virtual scenes or merge virtual contents with real scenes, transforming people's interaction ways change from 2D interaction to 3D interaction. VR technology, for example, uses head-mounted devices to simulate 3D interactive scenes in the real world. AR technology, for example, overlays various information and images into the real world through electronic devices (such as mobile phones, tablets, glasses, etc.). MR technology is between VR technology and AR technology. It uses digital technology to implement complex scenes of real-time interaction between the virtual world, the real world, and users.

In some products, the content of the functional region is still displayed in a basic two-dimensional plane segmentation method. The problems caused by this include: if the spatial layout is compressed, the relevant functional information region is compressed, resulting in incomplete information display and even intrusion into the main content region; if the spatial layout is increased, the intimacy of information is significantly reduced, and a visual focus is severely dispersed. In other products, even if a self-adaptation layout is applied, the limitation of information displayed in the same two-dimensional plane is still very large, and a space utilization rate is not high. In addition, if the spatial display layout is large enough, a visual relevance between some auxiliary contents and a main content will be lost. Generally speaking, in these products, if users open a plurality of functional regions at the same time, the plurality of functional regions will occupy a display space of a focus information region, which is not conducive to information displaying. If there are extreme layout changes in a two-dimensional user interface, it will also cause waste of space.

The embodiments of the present disclosure propose a scheme for displaying content in a virtual scene. According to various embodiments of the present disclosure, a set of contents associated with a first content contained in a first window is obtained, and the first window is presented in the virtual scene; in the virtual scene: the first window is presented simultaneously with presenting a second window and an indication of the association relationship between the first content and the second window is presented, and the second window is used to display at least a portion of a set of contents.

In this way, the embodiments of the present disclosure may reduce the waste of space of a window, enhance the intimacy of the associated content and information relevance, and improve the efficiency of user obtaining information.

For convenience of description, comments will be used below as an example of "associated content" to describe the embodiments of the present disclosure. However, it should be understood that embodiments of the present disclosure may further be applied to the presentation and interaction of other appropriate "associated content" in the virtual scene, such as the provenance of the displayed content. In addition, "comments" in the present disclosure should be understood to include other forms such as annotations and remarks on the content.

The following will describe the example implementations of the present disclosure with reference to the accompanying drawings.

FIG. 9 illustrates a schematic diagram of an example environment 900 in which embodiments of the present disclosure may be implemented. There are a plurality of users in the environment 900, such as two users, a user 940-1 wearing a XR device 910-1, a user 940-2 wearing a XR device 910-2. The XR device 910-1 communicates with a computing device 920-1 to reconstruct a virtual scene for the user 940-1 or merge virtual contents with real scenes; the XR device 910-2 communicates with a computing device 920-2 to reconstruct a virtual scene for the user 940-2 or merge virtual contents with real scenes. In some embodiments, the computing device 920-1 and computing device 920-2 may communicate wirelessly to construct a common virtual scene for the user 940-1 and user 940-2, without limiting the plurality of users to be in the same physical space. In this disclosure, virtual scenes reconstructed based on VR technology, as well as scenes where virtual content and real scenes are merged based on AR technology or MR technology, are collectively referred to as virtual scenes 930.

The XR device 910 may be a head-mounted or wearable near-eye display device, such as a head-mounted display, smart glasses, etc., supporting technologies such as VR, AR, MR, etc. The XR device 910 may include image generation components and optical display components for constructing the virtual scene 930 in a monocular or binocular field of view and displaying virtual objects. The virtual objects may include three-dimensional virtual objects and/or two-dimensional virtual objects. The virtual objects such as display blocks in the virtual scene 930. In some examples, the display block may be a two-dimensional window without thickness, which is used to load web pages, documents, etc. In some examples, display blocks are also referred to as "patches".

In some embodiments, the computing device 920 may determine a relative position between a hand of the user 930 (or its corresponding virtual hand) and a virtual object. The computing device 920 may be a separate device capable of communicating with the XR device 910 and/or other image capture devices (such as servers computing nodes, etc., for image or data processing) may also be integrated with the XR device 910 and/or other image capture devices. In some embodiments, the computing device 920 may be implemented as the XR device 910, i.e., in this case, the XR device 910 may implement all the functions of the computing device 920. It should be understood that the above description of the computing device 920 is merely exemplary and not restrictive, the computing device 920 may be implemented in various forms, structures, or categories of devices, and the embodiments of the present disclosure are not limited thereto.

It should be understood that the structure and function of the environment 900 are described for illustrative purposes only, without implying any limitation on the scope of the present disclosure.

The following will continue to be described some example embodiments of the present disclosure with reference to the accompanying drawings.

FIGS. 10A to 10D illustrate schematic diagrams of an example 200A, example 200B, example 200C and example

200D of displaying a set of comments in a virtual scene according to some embodiments of the present disclosure. The example 200A, example 200B, example 200C and example 200D may be implemented at the computing device 920. The example 200A, example 200B, example 200C and example 200D will be described below with reference to FIG. 9.

Figure 10A:
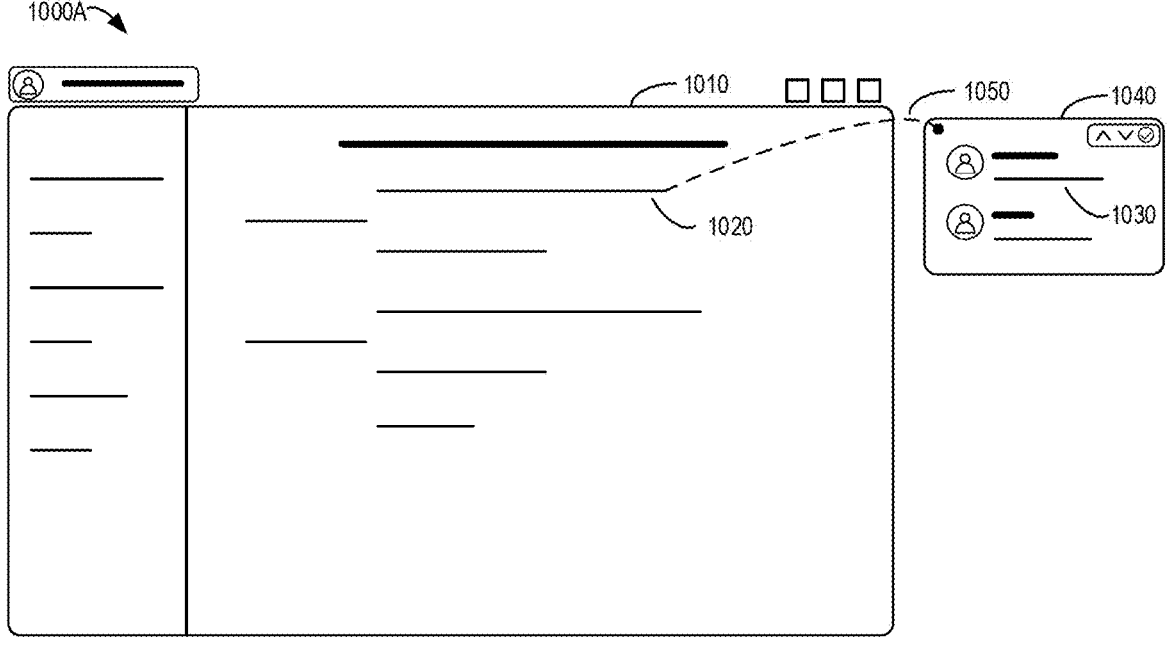
Figure 10B:
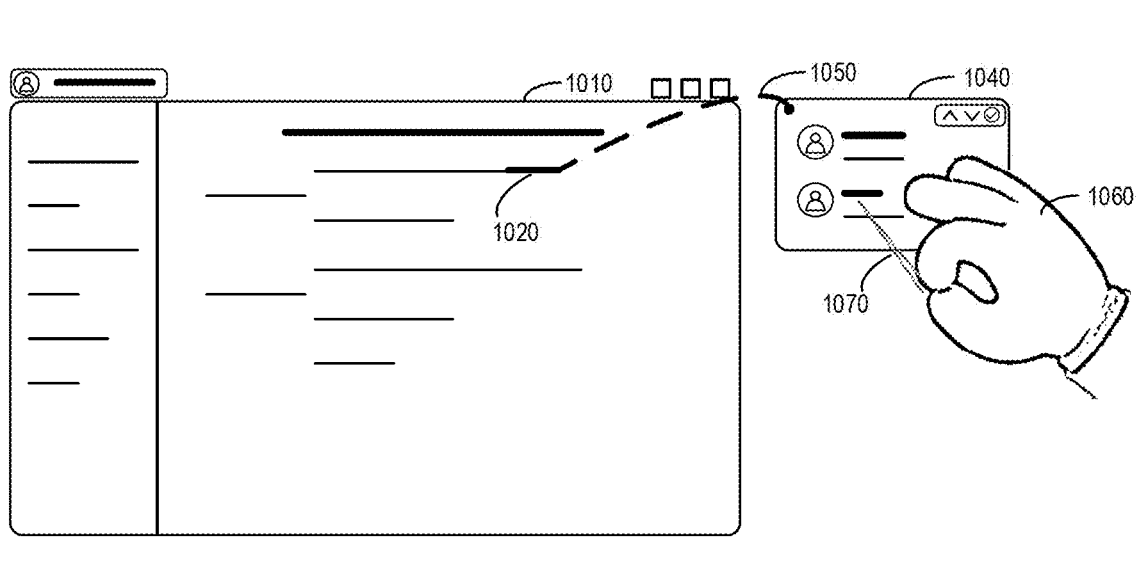

The computing device 920 may construct a window 1010 and a window 1040 as shown in FIG. 10A in the virtual scene 930. In a VR scene, the computing device 920 may further, for example, draw a virtual hand 1060 for characterizing a hand of the user 940 as shown in FIG. 10B. Such a virtual hand 1060 may be drawn based on tracking the hand of the user 940 so that gestures made by the user 940 may be detected and represented by the movement of the virtual hand 1060 in the virtual scene 930. It should be understood that any suitable means, such as image recognition, sensor positioning, or the like, may be employed to detect hand movements of the manipulator, and the present disclosure is not intended to limit this.

It should be understood that in scenes such as AR, the virtual hand 1060 may not be drawn, and the user 940 may directly interact with the window 1010 or window 1040 in the virtual scene 930 through the hand. For example, the window 1010 and window 1040 may be virtual objects superimposed on the real view of the user 940. The user 940 may interact with the windows through gestures. For convenience of description only, the present disclosure describes the VR scene as an example.

The computing device 920 obtains a set of contents 1030 associated with a content 1020 contained in the first window 1010. The window 1010 may load documents or web pages and other contents, also referred to herein as a first window.

In some embodiments, window 1010 may be used to present any suitable type of content, including but not limited to: text content, picture content, table content, video content, music content, etc. The presented content may include, for example, a content locally stored in the computing device 920, or may include a content received by the computing device 920 from other devices (e.g., Cloud).

As an example, as shown in FIG. 10A, the window 1010 may be, for example, a document viewing window, which may enable a user to view contents of documents through the window 1010. Such documents may include, for example, local documents or online cloud documents.

In some embodiments, the set of contents 1030 is also referred to as an associated content of the content 1020, which indicates that there is an association between the set of contents 1030 and the content 1020. For example, a content of a comment and a content targeted by a comment may be understood as the presence of a particular association; a content referenced from a particular provenance and the particular provenance may be understood as the presence of a particular association. It should be understood that the association in the present disclosure may also include any other suitable content association.

In some embodiments, the set of contents includes a first set of comments for the first content. A portion of the content used by window 1010 to present may be associated with one or more comments. Taking an online document as an example, a plurality of users may comment on particular sentences or paragraphs in the online document.

The computing device 920 may obtain the set of contents 1030 related to the currently presented content in the window 1010, and then draw a window 1040 (also referred to as a second window) corresponding to the set of contents 1030 in the virtual scene 930. The window 1040 may be a comment viewing window, which may support the user 940 to present a set of comments related to the currently presented content in the window 1010 in the form of a preview. For example, the window 1040 presents a predetermined number of comments in order of the time when the comments are published, and then presents all comments after the user activates the window. The window 1040 may further support presenting all comments in a set of comments related to the currently presented content in the window 1010 to the user 940.

The computing device 920 presents the window 1010 simultaneously with presenting the window 1040 in the virtual scene 930. The window 1040 is displayed in a form independent of the window 1010, also referred to herein as a second window. In some embodiments, the computing device 920 may adjust a size of the window 1040 according to how many contents of the set of contents 1030. In some embodiments, the window 1040 is always displayed on the right side of the window 1010 and maintained a predetermined distance. The window 1040 is not superimposed or partially superimposed on the window 1010, thereby avoiding occlusion of contents loaded in the window 1010. In some embodiments, the computing device 920 supports scaling operations on the window 1010 and window 1040 using different proportions, respectively.

The computing device 920 presents representing an indication 1050 representing an association relationship between the content 1020 and the window 1040 in the virtual scene 930. The indication 1050 may be presented in any form, such as a thin line, a gradient line and other forms. In some embodiments, the indication 1050 is connected to the content 1020 and window 1040 in the form of a dashed line, so that the content 1020 and window 1040 always maintain visual relevance, thereby enhancing the intimacy and information relevance of the main content and auxiliary content, and improving the efficiency of user obtaining information.

As an example, as shown in FIG. 10A, one of the users 940 initiates document sharing. When a document is loaded into the window 1010, the computing device 920 monitors the window 1010. If it does not monitor any comment content in a document content currently displayed by the window 1010, the computing device 920 displays the document content in the form of a pure document. If it monitors that the commented or annotated content 1020 appears in the document content currently displayed by the window 1010, the computing device 920 loads the set of contents 1030 associated with the content 1020 in the window 1040.

In some embodiments, the computing device 920 in response to a first operation on the window 1040, highlights the content 1020 and/or the indication 1050. Highlighting, for example, rendering the content 1020 and/or indication 1050 in the form of highlighting, bolding, etc. to attract the visual focus of the user 940. As one example, shown in FIG. 10B, when the virtual hand 1060 points to or selects window 1040 through a gesture, the content 1020 and indication 1050 are presented in bold form.

Figure 10C:
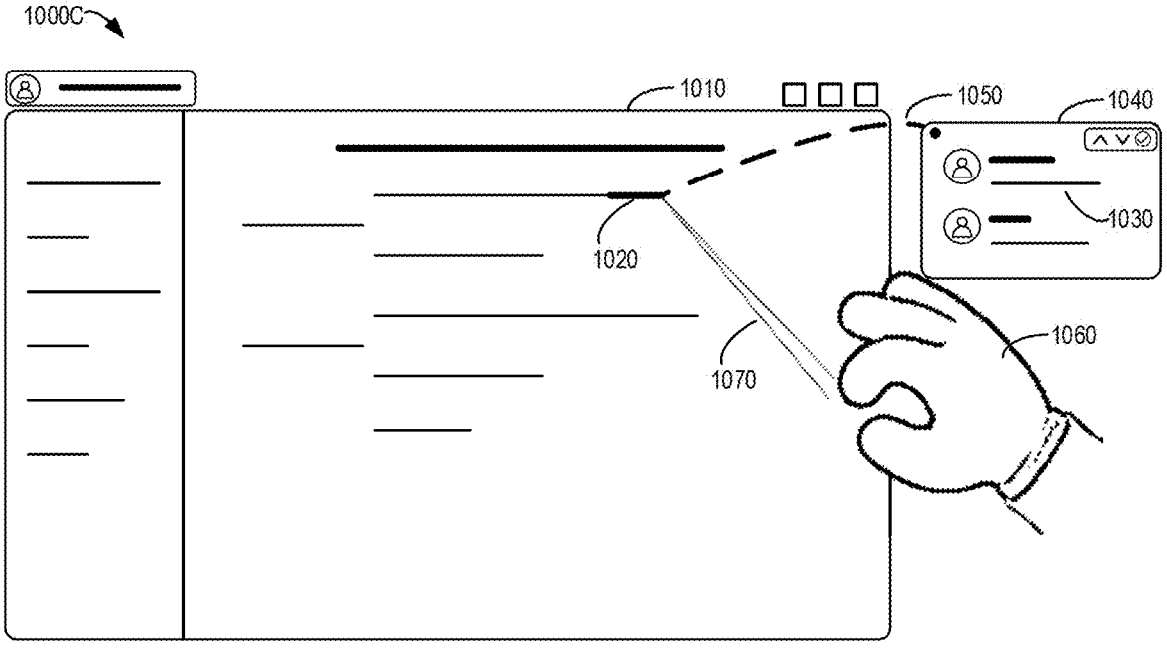

As another example, shown in FIG. 10C, when the virtual hand 1060 points to the content 1020 or is suspended in the region of the window 1010 through gestures, the content 1020 and the indication 1050 are presented in bold form. Additionally or alternatively, the computing device 920 detects the operation gesture of the virtual hand 1010 and generates a virtual ray 1070 to assist the virtual hand 1060 in interacting with the content in the window 1010, such as pointing to the content 1020. Alternatively, the virtual ray 1070 is invisible to the user 940 to enhance the user's immersion in the virtual scene 940.

In some embodiments, the computing device 920, based on a relative position of the content 1020 in the window 1010, adjusts a display position of the window 1040 in the virtual scene 930 to enhance the intimacy of the window 1040 and the content 1020, to improve the efficiency of the user 940 obtaining information.

Figure 10D:
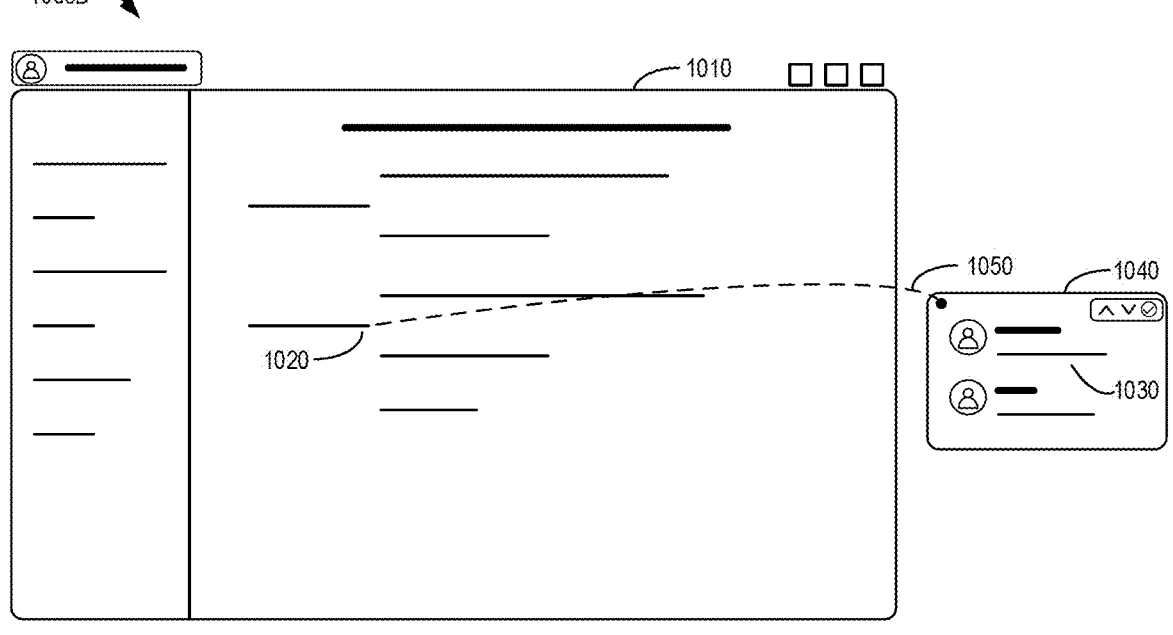

As an example, FIGS. 10A and 10D, if the content 1020 is close to the upper frame of the window 1010, the computing device 920 controls the window 1040 to be displayed on the upper right side of the window 1010; if the content 1020 is in the middle of the window 1010, the computing device 920 controls the window 1040 to be displayed in the middle right side of the window 1010.

Taking comments as an example of associated contents, FIGS. 11A and 11B illustrate schematic diagrams of examples 1100A and 1100B of displaying a plurality of sets of comments in the virtual scene according to some embodiments of the present disclosure. The examples 1100A and 1100B may be implemented at the computing device 920. The examples 1100A and 1100B will be described below with reference to FIG. 9.

When the computing device 920 monitors that a plurality of contents 1020 appear in the document content currently displayed by the window 1010, the computing device 920 loads a plurality of sets of comments 1020 associated with the plurality of contents in a plurality of the windows 1040, respectively. The plurality of windows 1040 maintain a predetermined distance from the window 1010 and are displayed sequentially, with each window being independent and unobstructed. The indication 1050 between the window 1040 and the corresponding content 1020 is always presented.

As an example, as shown in FIG. 11A, the computing device 920 monitors the appearance of a commented content 1020-1, content 1020-2, and content 1020-3 in the window 1010. Based on relative positions of the content 1020-1, content 1020-2, and content 1020-3 in the window 1010, the computing device 920 displays the window 1040-1 on the upper right side of the window 1010, displays the window 1040-2 in the middle right side of the window 1010, and displays the window 1040-3 on the bottom right side of the window 1010, respectively. The window 1040-1, window 1040-2, and window 1040-3 are displayed sequentially downward without overlapping or blocking each other.

As an example, as shown in FIG. 11B, the computing device 920 monitors the presence of the commented content 1020-1, content 1020-2, and content 1020-3 in the window 1010. Based on relative positions of the content 1020-1, content 1020-2, and content 1020-3 in the window 1010 and the number of commented contents, the computing device 920 first displays the window 1040-1 on the upper right side of the window 1010. Due to the excessive length of comments associated with the content 1020-1 or the excessive number of comments, the computing device 920 displays the window 1040-1 in a first column on the right side of the window 1010 and adjusts a length of the window 1040-1 based on the number of comments it includes. Optionally, when the length of the window 1040 exceeds a threshold, the computing device 920 adds an interface element to the window 1040. The user 940 may control the interface element by operating gestures to view all comments associated with the content 1020-1. Then, the computing device 920 arranges the window 1040-2 and window 1040-3 in a second column on the right side of the window 1010. The window 1040-1, window 1040-2, and window 1040-3 are sequentially displayed without overlapping or blocking each other, and always maintain the connection and pointing relationship with the window 1010.

FIGS. 12A to 12D illustrate schematic diagrams of an example 1200A, example 1200B, example 1200C, and example 1200D of displaying a plurality of sets of comments in the virtual scene according to some embodiments of the present disclosure. The examples 1200A, 1200B, 1200C, and 1200D may be implemented at the computing device 920. The examples 1200A, 1200B, 1200C, and 1200D will be described below with reference to FIG. 9.

Figure 12A:
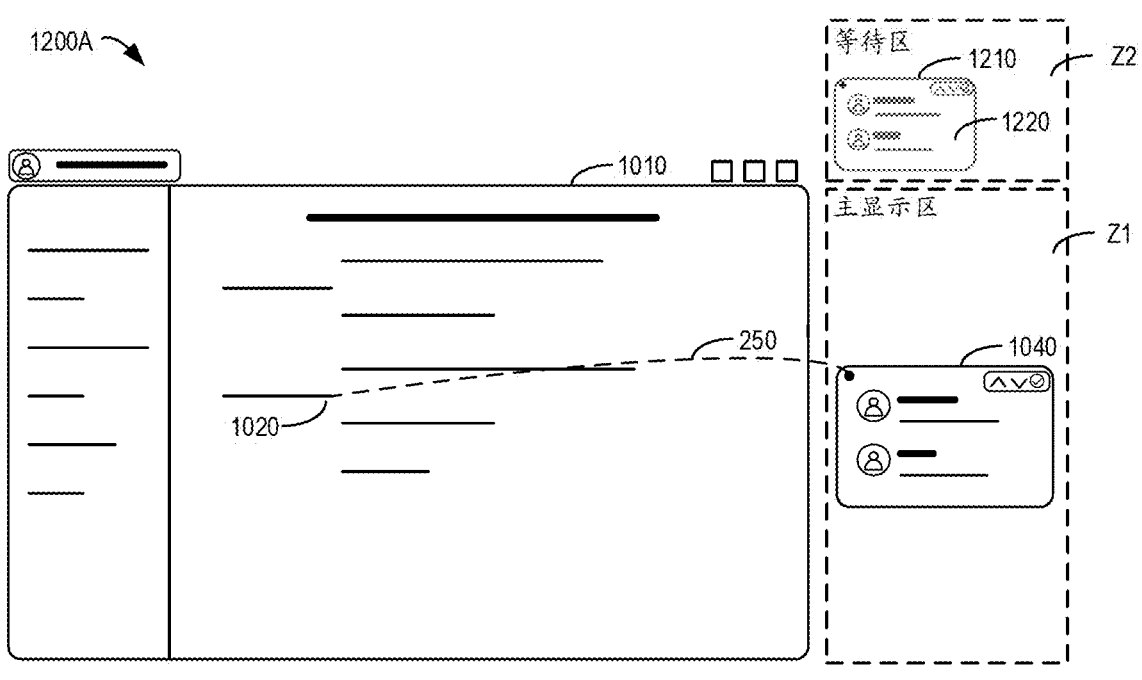

In some embodiments, the window 1010 is a viewing window for a target content. When a length of the target content exceeds a display range of the window 1010, the computing device 920 controls the window 1010 to display a portion of the target content. The user 940 may turn pages by operating gestures, such as activating and sliding the window 1010, to view the rest of the target content through the window 1010. As an example, as shown in FIG. 12A, the computing device 920 monitors all target contents. When the computing device 920 monitors that the target content is included in the content currently displayed by the window 1010, it displays the window 1040 and the associated indication 1050. When the computing device 920 monitors that other commented second content is included in the target content being not displayed by the window 1010, it displays the window 1210, also referred to as a third window herein. The window 1210 is used to display a second set of contents 1220 associated with the second content. Alternatively, the way other associated content is displayed through the third window is triggered upon receiving a request from the user to view all associated contents of a document (e.g., view all comments).

In some embodiments, the computing device 920 sets a main display region Z1 and a waiting region Z2 outside the region of the window 1010. As shown in FIG. 12A, the main display region Z1 is set, for example, on the right side of the window 1010 and is spaced a predetermined distance from the window 1010. The computing device 920 sequentially displays the windows 1040 in the main display region Z1 and may adjust a size of the main display region Z1 based on the number of the windows 1040. The display indication 1050 is always displayed between the window 1040 and the content 1020. The waiting region Z2 is set, for example, in the upper right corner of the window 1010 and is spaced a predetermined distance from the window 1010. The computing device 920 presents a window 1210 in a relatively non-outstanding way in the waiting region Z2, such as displaying an outline of the window 1210 in a smaller size and lighter color, and displaying the second set of contents 1220 associated with the second content in a preview, abbreviated form, or blurred form. The window 1210 is displayed in the waiting region Z2.

Figure 12B:
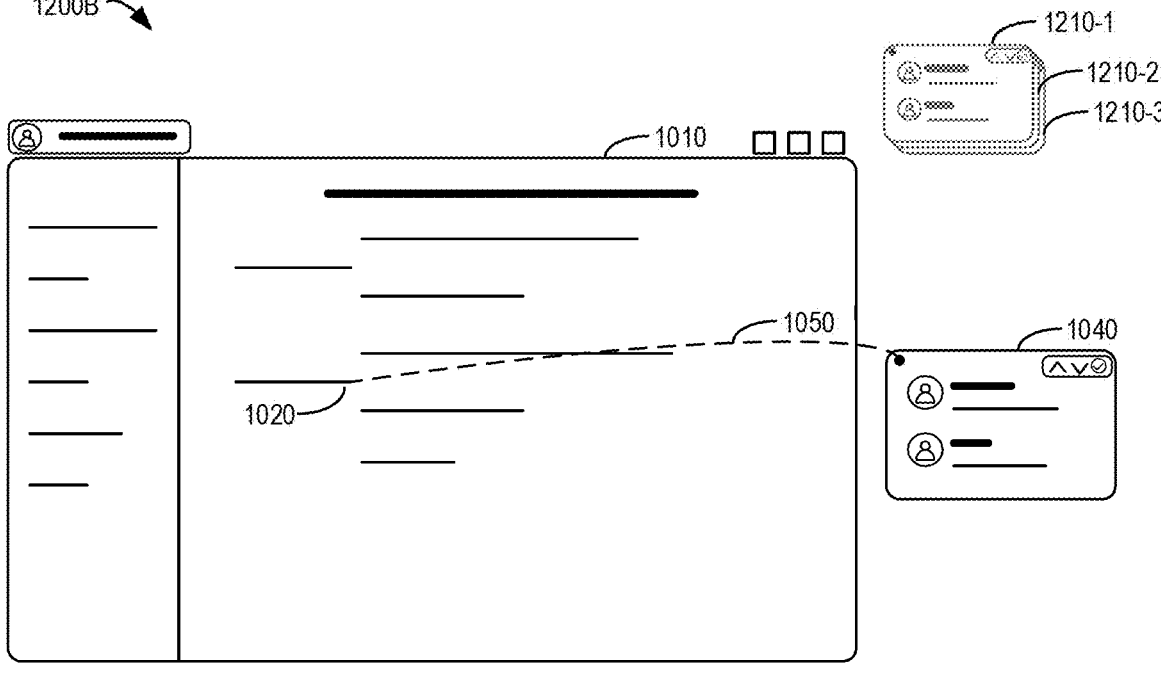

In some embodiments, a style of window 1210 is used to indicate the number of the second set of contents 1220. The number of the second set of contents 1220 may be the number of aggregated comments for the same content after a plurality of comments are aggregated into one aggregated comment, or it may be the number of independent comments for the same content. As shown in FIG. 12B, when the computing device 920 monitors that three other commented second contents are included in the target content that window 1010 does not display, it displays three windows 1210, such as a window 1210-1, window 1210-2, and window 1210-3. Additionally or alternatively, the computing device 920 displays the window 1210-1 corresponding to the second content closest to the content 1020 currently displayed by the window 1010. The window 1210-2 and window 1210-3 are arranged sequentially behind the window 1210-1 and extended in the longitudinal space in the Z-axis direction, improving the flexibility of local content.

In some embodiments, the computing device 920 supports a global mode of viewing comments on and off. When the global mode of viewing comments is turned on, the computing device 920 monitors all target contents. When the computing device 920 monitors that a plurality of other second contents to be commented on are included in the target content being not displayed by the window 1010, it displays a plurality of the windows 1210; when the global mode of viewing comments is turned off, the computing device 920 closes the displayed window 1210, and only monitors whether the content 1020 is included in the content currently displayed by the window 1010.

Figure 12C:
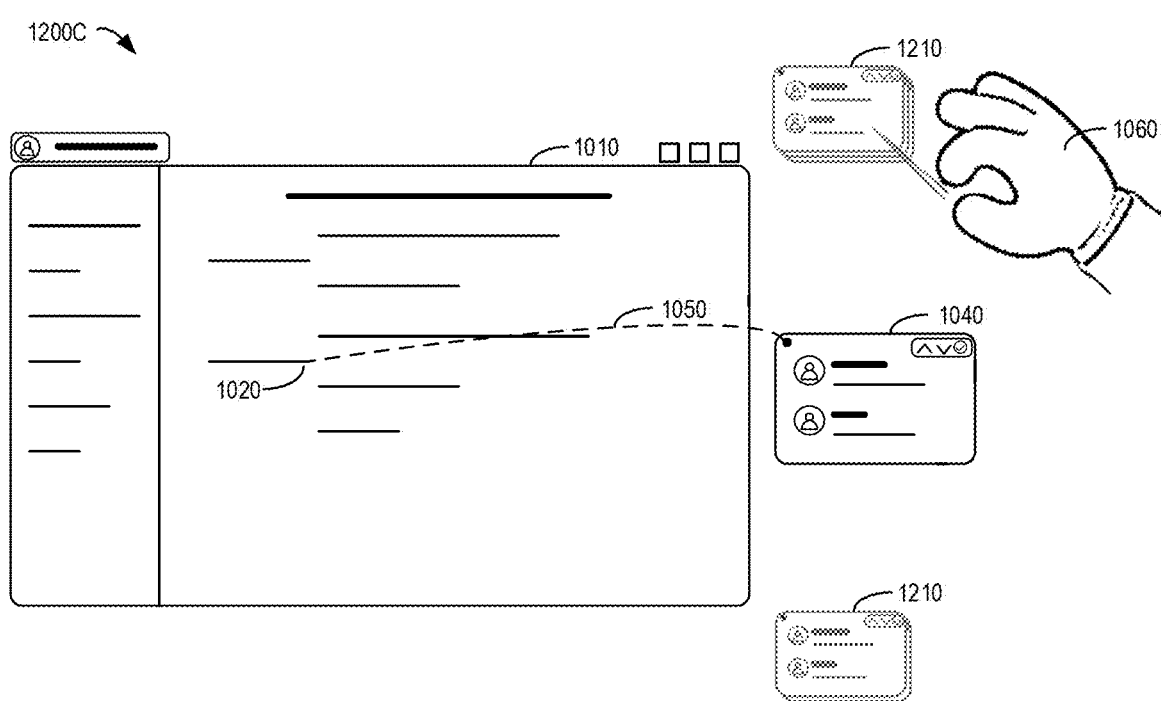

In some embodiments, when the length of the target content exceeds the display range of the window 1010, the computing device 920 controls the window 1010 to be currently presented a predetermined portion of the target content. As an example, as shown in FIG. 12C, the computing device 920 monitors all target content. When the computing device 920 monitors that the predetermined portion of the target content currently displayed by the window 1010 includes the content 1020, it displays the window 1040 and the associated indication 1050. When the computing device 920 monitors that a prior portion of the predetermined portion currently displayed by the window 1010 includes a prior comment, it displays the window 1210 corresponding to the prior comment in a first direction (e.g., directly above) relative to the window 1040. When the computing device 920 monitors a subsequent portion of the predetermined portion currently displayed by the window 1010 includes a subsequent comment, it displays the window 1210 corresponding to the subsequent comment in a second direction (e.g., directly below) relative to the window 1040.

Figure 12D:
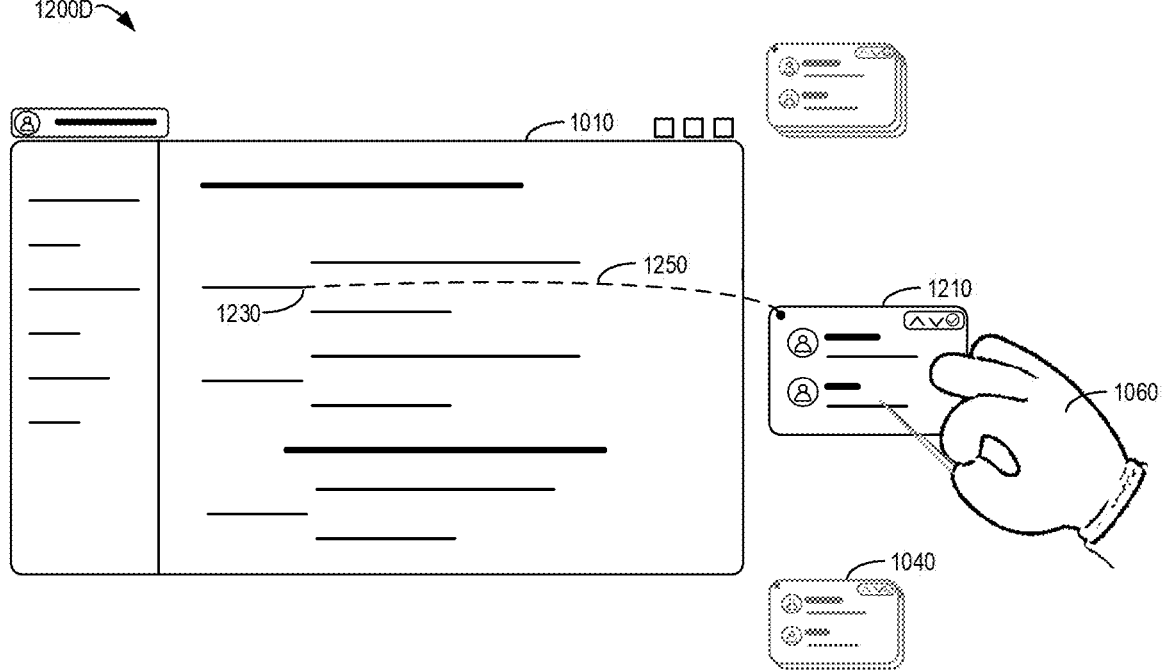

In some embodiments, in conjunction with FIGS. 12A, 12C, and 12D, when the user 940 selects (e.g., clicks, or points and pinches) the window 1210 through the virtual hand 1060, the computing device 920 scrolls the content currently displayed by the window 1010 to the corresponding portion of the target content, which includes a second content 1230 associated with the window 1210. At the same time, the computing device 920 moves the window 1210 from the waiting region Z2 to the main display region Z1 and sequentially moves the window 1040 to other positions in the main display region Z1 or to the waiting region Z2. The computing device 920 displays an indication 1250 between the second content 1230 and window 1210. It will be appreciated that after the computing device 920 moves the window 1210 to the main display region Z1, the window 1210 becomes a window 1040, that is, the third window becomes a second window. After the computing device 920 moves the window 1040 from the main display region Z1 to the waiting region Z2, the window 1040 becomes a window 1210, that is, the second window becomes a third window.

In some embodiments, the computing device 920 sets an interface element near by the window 1010 for controlling the expansion or retraction the window 1040 and window 1210, to display or hide comments.

FIGS. 13A and 13B illustrate schematic diagrams of an example 1300A and example 1300B of displaying or hiding comments according to some embodiments of the present disclosure. The examples 1300A and 1300B may be implemented at the computing device 920. The examples 1300A and 1300B will be described below with reference to FIG. 9.

As shown in FIG. 13A, the computing device 920 sets an interface element 1310 (e.g., graphical control) outside the upper right corner of the window 1010. when the virtual hand 1060 points to or selects the interface element 1310 by gestures, all comment windows (e.g., the windows 1040 and 1210) are retracted, and when pointing to or selecting the interface element 1310 again, the comment windows are expanded. Additionally or alternatively, as shown in FIG. 13B, the computing device 920 sets an interface element 1320 (e.g., graphical control) in the upper right corner of the window 1040. The user 940 completes the processing of comments (e.g., commented contents) inside the window 1040, and may control the virtual hand 1060 to point to or select the interface element 1320 by gestures to hide the window 1040.

In some embodiments, the first and second windows may have a non-zero predetermined angle in the virtual scene, so that both are not simply tiled and presented. FIG. 14 illustrates a schematic diagram of an example of presenting a first window and a second window according to some embodiments of the present disclosure. The example 1400 may be implemented at the computing device 920. The example 1400 will be described below with reference to FIG. 9.

The computing device 920 is a VR device, for example. The example 1400 is included in the virtual scene 930 constructed by the VR device. FIG. 14 illustrates a side view and a top view of the window 1010 in virtual scene 930, as well as a side view and a top view of the window 1040, respectively. As can be seen from the figure, the window 1040 is independently suspended outside the window 1010 in a floating window style and forms a certain angle with the window 1010. In some embodiments, the computing device 920 adjusts the orientation of the window 1010 and window 1040 based on a position of the virtual avatar of the user 940 and may adaptively adjust an angle between the window 1010 and window 1040 to improve the identification of content and the efficiency of information obtaining.

The above embodiments relate to a gesture operation implemented by the virtual hand 1060, the embodiments may be controlled by the user 940 in the application scene based on VR technology and MR technology. It will be appreciated, in the application scene based on AR technology, the user 940, for example, may be directly operated by a finger (click, double-click, etc.) to complete.

In some embodiments, the computing device 920 based on a predetermined field of view range of a current user in the virtual scene 930 to determine styles of the first window and the second window. The predetermined field of view range refers to a specific region or a specific range in the field of view of the current user in the virtual scene.

FIG. 15 illustrates a schematic diagram of an example of a predetermined field of view range according to some embodiments of the present disclosure. The example 1500 may be implemented at the computing device 920. The example 1500 will be described below with reference to FIG. 9.

The computing device 920 is, for example, a VR device. The example 700 is, for example, included in the virtual scene 930 constructed by the VR device. The computing device 920 loads a predetermined field of view range based on the position of the virtual avatar of the user 940. A view of the user 940 is a spatial range that may be seen by the eyes when the head and eyeballs are fixed, usually represented by angles. The predetermined field of view range is less than or equal to the view of the user 940. To avoid interfering with the user 940's attention, boundary lines of the predetermined field of view range are not visible to the user 940. The predetermined field of view range includes a main visual region 1510 and an auxiliary visual region 1520. The main visual region 1510 is a focal range for human eyes, for example, with the visual center as a center point, within a range of 30° to the left and right in the horizontal direction, and 30° to the top and bottom of the vertical direction. The auxiliary visual region 1520 is used to display some auxiliary information, such as a range from −60° to −30° and from +30° to +60° in the horizontal direction, and from −70° to −30° and from +30° to +50° in the vertical direction. In order to highlight the window 1010, the computing device 920 controls the window 1010 to be displayed in the main visual region 1510. To display the window 1040 without distracting the user 940, the computing device 920 controls window 1040 to be displayed in the auxiliary visual region 1520. Additionally or alternatively, the computing device 920 adjusts the angle between the window 1010 and window 1040 based on a scaling ratio of the window 1010 and window 1040, so that the window 1010 is displayed in the main visual region 1510 and the window 1040 is displayed in the auxiliary visual region 1520.

In some embodiments, the computing device 920 detects a second operation of the user 940 on the second window and presents a first set of comments in a display domain specific to the user 940. The operation of the user on the window may also be described as an operation performed by its corresponding virtual avatar on the window in the virtual scene. A presentation in the display domain specific to the user is, for example, a display relative to the user's virtual avatar.

FIGS. 16A to 16C illustrate schematic diagrams of an example 1600A, example 1600B, and example 1600C of displaying a first set of comments relative to a virtual avatar according to some embodiments of the present disclosure. The examples 1600A, 1600B, and 1600C may be implemented at the computing device 920. The examples 1600A, 1600B, and 1600C are described below with reference to FIG. 9. The computing device 920 is, for example, a VR device. The examples 1600A, 1600B, and 1600C are included in the virtual scene 930 constructed by the VR device.

As an example, as shown in FIG. 16A, the computing device 920 may adjust display positions of the window 1010 and window 1040 in a public domain based on the position of the virtual avatar of the user 940. The public domain refers to a public content display domain in the virtual scene constructed by the computing device 920 and server 930. The content displayed in the public domain is visible to all users. Specifically, based on the position of the virtual avatar 1610 of the user 940-1, the XR device 910-1 worn by the user 940-1 adjusts the window 1010 and window 1040 to face the virtual avatar 1610, so that the user 940-1 may comfortably browse the content in the window 1010 and window 1040. Similarly, based on the position of the virtual avatar 1620 of the user 940-2, the XR device 910-2 worn by the user 940-2 adjusts the window 1010 and window 1040 to face the virtual avatar 1620, so that the user 940-2 may comfortably browse the content in the window 1010 and window 1040.

In some embodiments, the computing device 920 may, based on a second operation of the user 940 on the window 1040, present the window 1040 in a display domain specific to the user, also referred to as a private domain. The private domain refers to a private content display domain in the virtual scene constructed by the computing device 920 that is only presented to the current user. As shown in FIG. 16B, the computing device 920-1 detects the second operation of the virtual avatar 1610 of the user 940-1 on the window 1040, and presents a set of contents 1030 (e.g., a set of comments for the content) in the private domain of the virtual avatar 1610, so that the user 940-1 operates on the set of contents 1030. As shown in FIG. 16C, the computing device 920-2 detects the second operation of the virtual avatar 1620 of the user 940-2 on the window 1040 and presents the set of contents 1030 in the private domain of the virtual avatar 1620, so that the user 940-2 operates on a set of contents 1030. The users 940-1 and 940-2, respectively, may operate on the set of contents 1030 in the private domain corresponding to the virtual avatar, without disturbing each other.

In some embodiments, the second operation may include an operation of dragging the second window from an initial position to the display domain specific to the current user. In conjunction with FIGS. 16A and 16B, the user 940-1 drags the window 1040 from the public domain to the private domain of the virtual avatar 1610 for a closer look. The second operation may further include an operation of replying at least one comment of the first set of comments. Taking a comment as an example of associated content, in conjunction with FIGS. 16A and 16B, the window 1040 includes an interface element that may be used to "reply a comment". If the user 940-1 wants to reply to a certain comment in the set of comments, the virtual avatar 1610 causes the window 1040 to be presented in the private domain of the virtual avatar 1610, for example, by clicking on the interface element of "reply a comment". The second operation may further include an operation of adding a comment associated with the first content. In conjunction with FIGS. 16A and 16B, the window 1040 includes an interface element that may be used to "create a comment", and if the user 940-1 wants to add a comment, the virtual avatar 1610 causes the window 1040 to be presented in the private domain of the virtual avatar 1610, for example, by clicking on the interface element of "create a comment".

In some embodiments, the second operation performed by the user 940-1 in the private domain of the virtual avatar 1610 is not visible to other users. When the user 940-1 completes the second operation (such as by clicking "complete" or "submit"), the comments displayed by the second window in the public domain are synchronously updated.

In summary, the embodiments of the present disclosure propose a scheme for displaying content in a virtual scene. According to various embodiments of the present disclosure, the first window is presented simultaneously with presenting the second window and the associated indication, which may increase the intimacy and relevance of information. Each window may have independent scaling logic and do not interfere with each other. A reasonable layout of a plurality of the second windows improves the efficiency of user obtaining information, reduces space waste of content carriers, and improves the flexibility of local contents.

FIG. 17 illustrates a flowchart of a process 1700 of displaying content in a virtual scene according to some embodiments of the present disclosure. The process 1700 may be implemented at the computing device 920. The process 1700 is described below with reference to FIG. 9.

At block 1710, the computing device 920 obtains a set of contents associated with a first content contained in a first window. The first window is presented in a virtual scene.

At block 1720, the computing device 920, in the virtual scene, presents the first window simultaneously with presenting a second window for displaying at least a portion of the set of contents; and presents an indication representing an association relationship between the first content and the second window.

In some embodiments, to present the first window simultaneously with presenting the second window, the computing device 920 presents the second window in the virtual scene such that the first window and the second window are presented with a predetermined angle in the virtual scene.

In some embodiments, the computing device 920 in response to a first operation on the second window, highlights the first content and/or the indication.

In some embodiments, a display position of the second window in the virtual scene is determined based on a relative position of the first content in the first window.

In some embodiments, the set of contents comprises a first set of comments for the first content.

In some embodiments, the computing device 920 in response to a second operation of a current user on the second window, presents at least a portion of the first set of comments in a display domain specific to the current user in the virtual scene.

In some embodiments, the second operation comprises: an operation of dragging the second window from an initial position to the display domain specific to the current user; an operation of replying at least one comment of the first set of comments; or an operation of adding a comment associated with the first content.

In some embodiments, the first window is a viewing window for a target content, the target content comprises the first content, and the set of contents comprise a first set of contents, the computing device 920, while presenting the first window and the second window, presents at least one third window for displaying at least a portion of a second set of contents. The second set of contents is associated with a second content of the target content which is currently not displayed by the first window.

In some embodiments, the second set of contents comprise a second set of comments for the second content.

In some embodiments, a style of the third window is to indicate a number of the second set of comments.

In some embodiments, the first window currently presents a predetermined portion of the target content, the computing device 920 in response to detecting a prior comment for a prior portion of the predetermined portion of the target content, presents a third window corresponding to the prior comment in a first direction relative to the second window; and/or in response to detecting a subsequent comment for a subsequent portion of the predetermined portion of the target content, presents a third window corresponding to the subsequent comment in a second direction relative to the second window.

In some embodiments, styles of the first window and the second window are determined based on a predetermined field of view range of a current user in the virtual scene.

FIG. 18 illustrates a block diagram of an apparatus 1800 for displaying content in a virtual scene according to some embodiments of the present disclosure. The apparatus 1800 may be implemented or included in the computing device 920. The various modules/components in the apparatus 1800 may be implemented by hardware, software, firmware, or any combination thereof.

As shown, the apparatus 1800 includes an obtaining module 1810 configured to obtain a set of contents associated with a first content contained in a first window. The first window is presented in a virtual scene. The apparatus 1800 further includes a presentation module 1820 configured to in the virtual scene: presenting the first window simultaneously with presenting a second window for displaying at least a portion of the set of contents; and presenting an indication representing an association relationship between the first content and the second window.

In some embodiments, in order to the first window simultaneously with presenting the second window, the second window is presented in the virtual scene such that the first window and the second window are presented with a predetermined angle in the virtual scene.

In some embodiments, the apparatus 1800 further comprising: a display module configured to in response to a first operation on the second window, highlight the first content and/or the indication.

In some embodiments, a display position of the second window in the virtual scene is determined based on a relative position of the first content in the first window.

In some embodiments, the set of contents comprises a first set of comments for the first content.

In some embodiments, the apparatus 1800 further comprising: a second presentation module configured to in response to a second operation of a current user on the second window, present at least a portion of the first set of comments in a display domain specific to the current user in the virtual scene.

In some embodiments, the second operation comprises: an operation of dragging the second window from an initial position to the display domain specific to the current user; an operation of replying at least one comment of the first set of comments; or an operation of adding a comment associated with the first content.

In some embodiments, the first window is a viewing window for a target content, the target content comprises the first content, and the set of contents comprise a first set of contents, the presentation module 1820 is further configured to: while presenting the first window and the second window, present at least one third window for displaying at least a portion of a second set of contents. The second set of contents is associated with a second content of the target content which is currently not displayed by the first window.

In some embodiments, the second set of contents comprise a second set of comments for the second content.

In some embodiments, a style of the third window is to indicate a number of the second set of comments.

In some embodiments, the first window currently presents a predetermined portion of the target content, the presentation module 1820 is further configured to: in response to detecting a prior comment for a prior portion of the predetermined portion of the target content, present a third window corresponding to the prior comment in a first direction relative to the second window; and/or in response to detecting a subsequent comment for a subsequent portion of the predetermined portion of the target content, present a third window corresponding to the subsequent comment in a second direction relative to the second window.

In some embodiments, styles of the first window and the second window are determined based on a predetermined range of a current user in the virtual scene.

FIG. 19 illustrates a block diagram of a computing device 1900 in which a plurality of embodiments of the present disclosure may be implemented. It should be understood that the computing device 1900 shown in FIG. 19 is merely exemplary and should not constitute any limitation on the functionality and scope of the embodiments described herein. The computing device 1900 shown in FIG. 19 may be used to implement the computing device 120 in FIG. 1 and/or the computing device 920 in FIG. 9.

As shown in FIG. 19, the electronic device 1900 is in the form of a general computing device. The components of electronic device 1900 may include, but are not limited to, one or more processors or processing units 1910, a memory 1920, a storage device 1930, one or more communication units 1940, one or more input devices 1950, and one or more output devices 1960. The processing unit 1910 may be an actual or virtual processor and can execute various processes based on the programs stored in the memory 1920. In a multiprocessor system, multiple processing units execute computer executable instructions in parallel to improve the parallel processing capability of the electronic device 1900.

The electronic device 1900 typically includes multiple computer storage medium. Such medium may be any available medium that is accessible to the electronic device 1900, including but not limited to volatile and non-volatile medium, removable and non-removable medium. The memory 1920 may be volatile memory (for example, a register, cache, a random-access memory (RAM)), a non-volatile memory (for example, a read-only memory (ROM), an electrically erasable programmable read-only memory (EEPROM), a flash memory), or any combination thereof. The storage device 1930 may be any removable or non-removable medium and may include a machine-readable medium such as a flash drive, a disk, or any other medium, which may be used to store information and/or data (such as training data for training) and may be accessed within the electronic device 1900.

The electronic device 1900 may further include additional removable/non-removable, volatile/non-volatile storage medium. Although not shown in FIG. 19, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 1920 may include a computer program product 1925, which has one or more program units configured to perform various methods or acts of various implementations of the present disclosure.

The communication unit 1940 communicates with a further electronic device through the communication medium. In addition, functions of components in the electronic device 1900 may be implemented by a single computing cluster or multiple computing machines, which can communicate through a communication connection. Therefore, the electronic device 1900 may be operated in a networking environment using a logical connection with one or more other servers, a network personal computer (PC), or another network node.

The input device 1950 may be one or more input devices, such as a mouse, a keyboard, a trackball, etc. The output device 1960 may be one or more output devices, such as a display, a speaker, a printer, etc. The electronic device 1900 may also communicate with one or more external devices (not shown) through the communication unit 1940 as required. The external device, such as a storage device, a display device, etc., communicate with one or more devices that enable users to interact with the electronic device 1900, or communicate with any device (for example, a network card, a modem, etc.) that makes the electronic device 1900 communicate with one or more other electronic devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment, or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

I claim:

1. A method of displaying content in a virtual scene, comprising:

detecting a first reference to a second content in a first content in a first window presented in a virtual scene;

in response to detecting the first reference, in the virtual scene:

presenting the first window simultaneously with presenting a second window for displaying a preview of the second content; and presenting an indication representing an association relationship between the first reference and the second window.

2. The method of claim 1, wherein the first window and the second window are presented at an angle.

3. The method of claim 1, wherein presenting the second window comprises:

determining a position of a virtual avatar corresponding to a current user of the virtual scene in the virtual scene; and presenting the second window based at least in part on the position of the virtual avatar.

4. The method of claim 1, further comprising:

in response to a first activation operation on the second window, presenting the first window in a first style and presenting the second window in a second style, the second style being visually more outstanding than the first style.

5. The method of claim 4, wherein the first window is initially displayed at a first position in the virtual scene, and the second window is displayed at a second position in the virtual scene, wherein presenting the first window in the first style comprises: switching the first window from the first position to a third position in the virtual scene;

and wherein presenting the second window in the second style comprises: switching the second window from the second position to be presented at the first position in the virtual scene.

6. The method of claim 5, further comprising:

in response to a selection for the first window, switching the first window from the third position to be presented at the first position in the virtual scene; and switching the second window from the first position to be presented at the second position in the virtual scene.

7. The method of claim 4, wherein the first activation operation comprises a predetermined operation on the second window or on the first reference in the first window.

8. The method of claim 4, further comprising:

in response to detecting a second reference to a third content contained in the second content, presenting the first window and the second window simultaneously with presenting a third window for displaying a preview of the third content; and presenting an indication representing an association relationship between the second reference and the third window.

9. The method of claim 8, further comprising:

in response to a second activation operation on the third window, presenting the third window in the first style, and presenting the fourth window in the second style, the first window being at least partially overlapped with the second window.

10. The method of claim 4, wherein the first style and the second style are determined based on a predetermined field of view range.

11. The method of claim 1, wherein a third reference to a fourth content is detected in the first content, the method further comprising:

presenting the first window and the second window simultaneously with presenting a fourth window for displaying a preview of the fourth content; and presenting an indication representing an association relationship between the third reference and the fourth window.

12. The method of claim 11, wherein the second window and the fourth window are presented in an overlapping style.

13. The method of claim 12, wherein the first window is initially displayed at a first position in the virtual scene, the method further comprising:

in response to an activation operation on at least one of the second window and the fourth window, switching the second window and the fourth window to be presented at the first position in the virtual scene in an overlapping style or a tiling style.

14. A method of displaying content in a virtual scene, comprising:

obtaining a set of contents associated with a first content contained in a first window, the first window being presented in a virtual scene; and in the virtual scene:

presenting the first window simultaneously with presenting a second window for displaying at least a portion of the set of contents; and presenting an indication representing an association relationship between the first content and the second window.

15. The method of claim 14, wherein presenting the first window simultaneously with presenting the second window comprises:

presenting the second window in the virtual scene such that the first window and the second window are presented at a predetermined angle in the virtual scene.

16. The method of claim 14, further comprising:

in response to a first operation on the second window, highlighting the first content and/or the indication.

17. The method of claim 14, wherein a display position of the second window in the virtual scene is determined based on a relative position of the first content in the first window.

18. The method of claim 14, wherein the set of contents comprises a first set of comments for the first content.

19. The method of claim 18, further comprising:

in response to a second operation of a current user on the second window, presenting at least a portion of the first set of comments in a display domain specific to the current user in the virtual scene.

20. The method of claim 19, wherein the second operation comprises:

an operation of moving the second window from an initial position to the display domain specific to the current user;

an operation of replying at least one comment of the first set of comments; or an operation of adding a comment associated with the first content.

21. The method of claim 14, wherein the first window is a viewing window for a target content, the target content comprises the first content, and the set of contents comprise a first set of contents, the method further comprising:

while presenting the first window and the second window, presenting at least one third window for displaying at least a portion of a second set of contents, the second set of contents being associated with a second content of the target content which is currently not displayed in the first window.

22. The method of claim 21, wherein the second set of contents comprise a second set of comments for the second content.

23. The method of claim 22, wherein a style of the third window is to indicate a number of the second set of comments.

24. The method of claim 22, wherein the first window currently presents a predetermined portion of the target content, and presenting the at least one third window comprises:

in response to detecting a prior comment for a prior portion of the predetermined portion of the target content, presenting a third window corresponding to the prior comment in a first direction relative to the second window; and/or in response to detecting a subsequent comment for a subsequent portion of the predetermined portion of the target content, presenting a third window corresponding to the subsequent comment in a second direction relative to the second window.

25. The method of claim 14, wherein styles of the first window and the second window are determined based on a predetermined field of view range of a current user in the virtual scene.

26. An electronic device, comprising:

at least one processing unit; and at least one memory coupled to the at least one processing unit and storing instructions for execution by the at least one processing unit, the instructions, when executed by the at least one processing unit, causing the electronic device to perform acts of displaying content, the acts comprising:

detecting a first reference to a second content in a first content in a first window presented in a virtual scene;

in response to detecting the first reference, in the virtual scene:

presenting the first window simultaneously with presenting a second window for displaying a preview of the second content; and presenting an indication representing an association relationship between the first reference and the second window, or, the acts comprising:

obtaining a set of contents associated with a first content contained in a first window, the first window being presented in a virtual scene; and in the virtual scene:

presenting the first window simultaneously with presenting a second window for displaying at least a portion of the set of contents; and presenting an indication representing an association relationship between the first content and the second window.

27. A non-transitory computer readable storage medium having stored thereon a computer program executable by a processor to implement acts of displaying content, the acts comprising:

detecting a first reference to a second content in a first content in a first window presented in a virtual scene;

in response to detecting the first reference, in the virtual scene:

presenting the first window simultaneously with presenting a second window for displaying a preview of the second content; and presenting an indication representing an association relationship between the first reference and the second window, or, the acts comprising:

obtaining a set of contents associated with a first content contained in a first window, the first window being presented in a virtual scene; and in the virtual scene:

presenting the first window simultaneously with presenting a second window for displaying at least a portion of the set of contents; and presenting an indication representing an association relationship between the first content and the second window.

* * * * *